(12) United States Patent
Hebrink et al.

(10) Patent No.: US 12,001,036 B2
(45) Date of Patent: Jun. 4, 2024

(54) MULTILAYER OPTICAL FILMS AND ARTICLES COMPRISING THE SAME

(71) Applicant: 3M INNOVATIVE PROPERTIES COMPANY, St. Paul, MN (US)

(72) Inventors: Timothy J. Hebrink, Scandia, MN (US); Stephen P. Maki, North St. Paul, MN (US); Charles D. Hoyle, Stillwater, MN (US); Joel D. Oxman, Minneapolis, MN (US); Matthew T. Scholz, Woodbury, MN (US); Justin M. Mazzoni, Cheshire, CT (US); Michael E. Griffin, Maplewood, MN (US); Anna C. Hamlin, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 595 days.

(21) Appl. No.: 17/280,447

(22) PCT Filed: Sep. 25, 2019

(86) PCT No.: PCT/IB2019/058145
§ 371 (c)(1),
(2) Date: Mar. 26, 2021

(87) PCT Pub. No.: WO2020/070589
PCT Pub. Date: Apr. 9, 2020

(65) Prior Publication Data
US 2022/0003904 A1 Jan. 6, 2022

Related U.S. Application Data

(60) Provisional application No. 62/741,886, filed on Oct. 5, 2018.

(51) Int. Cl.
*G02B 5/20* (2006.01)
*C08K 3/28* (2006.01)
(Continued)

(52) U.S. Cl.
CPC ............... *G02B 5/208* (2013.01); *C08K 3/28* (2013.01); *C08L 23/08* (2013.01); *C08L 27/18* (2013.01);
(Continued)

(58) Field of Classification Search
CPC .......... G02B 5/208; G02B 1/04; G02B 1/115; C08K 3/28; C08L 23/08; C08L 27/18
See application file for complete search history.

(56) References Cited

U.S. PATENT DOCUMENTS 5,084,096 A 1/1992 Stovicek
5,408,022 A 4/1995 Imazato
(Continued)

FOREIGN PATENT DOCUMENTS

CN 107783218 A 3/2018
JP H0866462 A 3/1996
(Continued)

OTHER PUBLICATIONS

Berreman, "Optics in Stratified and Anisotropic Media: 4x4-Matrix Formulation", Journal of the Optical Society of America, Apr. 1972, vol. 62, No. 4, pp. 502-510.
(Continued)

*Primary Examiner* — Ryan D Howard

(57) ABSTRACT

Multilayer optical film comprising at least a plurality of alternating first and second optical layers. Embodiments of the multilayer optical film are useful, for example, in UV-C shield, UV-C light collimator, and UV-C light concentrator applications.

7 Claims, 7 Drawing Sheets

(51) Int. Cl.
*C08L 23/08* (2006.01)
*C08L 27/18* (2006.01)
*G02B 1/04* (2006.01)
*G02B 1/115* (2015.01)
*G02B 19/00* (2006.01)

(52) U.S. Cl.
CPC ............... *G02B 1/04* (2013.01); *G02B 1/115* (2013.01); *C08L 2201/10* (2013.01); *C08L 2203/20* (2013.01); *G02B 19/0095* (2013.01)

(56) References Cited

U.S. PATENT DOCUMENTS

| | | | |
|---|---|---|---|
| 5,504,134 A | 4/1996 | Palmer | |
| 5,540,978 A | 7/1996 | Schrenk | |
| 5,876,688 A | 3/1999 | Laundon | |
| 6,224,898 B1 | 5/2001 | Balogh | |
| 6,440,405 B1 | 8/2002 | Cooper | |
| 6,449,093 B2 | 9/2002 | Hebrink | |
| 6,579,906 B2 | 6/2003 | Cooper | |
| 6,744,561 B2 | 6/2004 | Condo | |
| 6,783,349 B2 | 8/2004 | Neavin | |
| 7,569,181 B2 | 8/2009 | Golden | |
| 7,582,681 B2 | 9/2009 | Schmaus | |
| 8,426,778 B1 | 4/2013 | Bolt | |
| 8,512,723 B2 | 8/2013 | Scholz | |
| 9,393,350 B2 | 7/2016 | Mcgrath | |
| 9,459,386 B2 | 10/2016 | Hebrink | |
| 9,523,516 B2 | 12/2016 | Hebrink | |
| 2002/0005986 A1 | 1/2002 | Hebrink | |
| 2004/0145288 A1 | 7/2004 | Ouderkirk | |
| 2005/0099678 A1* | 5/2005 | Wang | ........... G02B 5/208 359/359 |
| 2006/0051384 A1 | 3/2006 | Scholz | |
| 2006/0052452 A1 | 3/2006 | Scholz | |
| 2006/0084780 A1 | 4/2006 | Hebrink | |
| 2007/0298216 A1 | 12/2007 | Jing | |
| 2008/0075960 A1 | 3/2008 | Pocius | |
| 2008/0090010 A1 | 4/2008 | Zhang | |
| 2011/0262754 A1 | 10/2011 | Zehentmaier | |
| 2013/0211310 A1 | 8/2013 | Bommarito | |
| 2015/0177432 A1* | 6/2015 | Hebrink | ........... G02B 5/208 359/359 |
| 2015/0219805 A1 | 8/2015 | Schreiber | |
| 2015/0285956 A1 | 10/2015 | Schmidt | |
| 2016/0259234 A1* | 9/2016 | Akiyama | ........... G03B 21/204 |
| 2017/0290934 A1 | 10/2017 | Dobrinsky | |
| 2017/0368215 A1 | 12/2017 | Shatalov | |
| 2018/0171157 A1 | 6/2018 | Magin | |

FOREIGN PATENT DOCUMENTS

| | | |
|---|---|---|
| JP | 2005221867 A | 8/2005 |
| WO | WO 2002-102244 | 12/2002 |
| WO | WO 2014-022049 | 2/2014 |
| WO | 2016069700 A1 | 5/2016 |

OTHER PUBLICATIONS

Block, Disinfection, Sterilization and Preservation Fourth Edition—Chapter 13, 225-255, (1991).

Stallinga, "Berreman 4x4 matrix method for reflective liquid crystal displays" Journal of Applied Physics, Mar. 1999, vol. 85, No. 6, pp. 3023-3031.

International Search Report for PCT International Application No. PCT/IB2019/058145, dated Jan. 16, 2020, 3 pages.

* cited by examiner

MULTILAYER OPTICAL FILMS AND ARTICLES COMPRISING THE SAME

CROSS REFERENCE TO RELATED APPLICATIONS

This application is a national stage filing under 35 U.S.C. 371 of PCT/IB2019/058145, filed Sep. 25, 2019, which claims the benefit of U.S. Application No. 62/741,886, filed Oct. 5, 2018, the disclosure of which is incorporated by reference in its/their entirety herein.

BACKGROUND

Ultraviolet (UV) light and blue light are useful, for example, for initiating free radical reaction chemistries used in coatings, adhesives, and polymeric materials. Ultraviolet light is also useful, for example, for disinfecting surfaces, filters, bandages, membranes, articles, air, and liquids (e.g., water). Examples where UV-C (i.e., a wavelength in range from 100 to 280) disinfection could be applied include medical offices and supplies, airplane restrooms, hospital rooms and surgical equipment, schools, air and water purification, and consumer applications (e.g., toothbrush and cell phone disinfection). Prevention of infection and spread of disease, especially in high-risk environments and populations, has become increasingly more critical as pathogens mutate and develop antibiotic resistance. The availability and speed of global human travel elevates risks of rapidly developed epidemics/pandemics. Air and water disinfection is paramount to human health and preventing infectious disease. Benefits of UV-C disinfection include touch-free application, and the mechanical disruption of cells at non-gene specific targets is unlikely to be overcome by pathogens via mutation to develop resistance. Surfaces being disinfected with ultraviolet light other than metal, ceramic, or glass surfaces will need protection from ultra-violet light. UV-C irradiation can be applied to effectively inactivate or kill prokaryotic and eukaryotic microorganisms alike, including bacteria, viruses, fungi and molds. Bacterial strains with developed resistance to one or more antibiotics are also susceptible to UV-C light. Some examples of pathogens of heightened interest include hospital acquired infections (e.g., C. diff, *E. coli*, MRSA, *Klebsiella, influenza,* mycobacteria, and enterobacteria), water and soil borne infections (e.g., *Giardia, legionella,* and *campylobacter*) and airborne infections (e.g., *influenza*, pneumonia, and *tuberculosis*).

Ultra-violet light and high intensity blue light, however, can also be harmful to people and animals in varying degrees. For example, dental curing lights output 400 to 500 nm wavelength light may cause long term damage to the eyes. There is a need for ultra-violet and blue light management designs that more efficiently direct the ultra-violet light and blue light to where it is needed while simultaneously protecting people, animals, and articles from damage caused by ultra-violet and blue light. There is also a benefit to the user (e.g., dental professional) for a maximum amount of visible light to transmit through the blue light shield, collimator, or concentrator.

SUMMARY

In one aspect, the present disclosure describes a multilayer optical film comprising at least a plurality of alternating first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident ultraviolet light (i.e., any light having a wavelength in a range from 100 to less than 400 nm) over at least a 30-nanometer wavelength reflection bandwidth in a wavelength range from at least 100 to 280 (in some embodiments, at least 180 to 280, even at least 200 to 280) nm. Embodiments of the multilayer optical film are useful, for example, in UV-C shield (for protecting polymers, paint, wood, articles, and people, animals, and graphics (e.g., graphic films) from UV-C degradation), UV-C light collimator, and UV-C light concentrator applications. Light collimators can be designed to collimate light from a point source and can be collimated using a parabolic (elliptical) reflective optical element. The main requirements are that the source be located near the focal point of the optical element and that the source be relatively small compared with the size of the optical element. Light concentrators can be designed utilizing a surface of revolution generated from a section of an ellipse with the source at one focus and the target at the other focus of the ellipse. The source at one focus shines toward the closest vertex of the ellipse. The section of the ellipse used to generate the surface of revolution is the section defined by the latus rectum at the source and the closest vertex to the source. The latus rectum must be larger than the source so that the concentrator can collect most of the light from the source. If the source and target were points, all the light from the source would be collected at the target.

In another aspect, the present disclosure describes a first UV shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 320 nm to less than 400 nm (UV-A). Such a UV shield is useful, for example, for protecting polymers, paint, wood, articles, and people, animals, and graphics (e.g., graphic films) from UV-A degradation.

In another aspect, the present disclosure describes a second UV shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 280 nm to less than 320 nm (UV-B). Such a UV shield is useful, for example, for protecting polymers, paint, wood, articles, people, animals, and graphics (e.g., graphic films) from UV-B degradation.

In another aspect, the present disclosure describes a third UV shield comprising fluoropolymer film and a multilayer optical film, the multilayer optical film comprises at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 100 to less than 280 (UV-C) (in some embodiments, 180 to 280, or even at least 200 to 280) nm. Such a UV shield is useful, for example, for protecting polymers, paint, wood, articles, graphics (e.g., graphic films), people, and animals from UV-C degradation.

A "graphic film" as used herein is any film that absorbs at least some visible or infrared light range and reflects at least some wavelengths of light in the visible range where the reflected light contains some graphical content. The graphical content may include patterns, images, or other visual indicia. The graphic film may be a printed film, or the graphic may be created by means other than printing. For example, the graphic film may be perforated reflective film with a patterned arrangement of perforations. The graphic film may also be created by embossing. In some embodiments, the graphic film is a partially transmissive graphic film. Exemplary graphic films are available under the trade designation "DINOC" by 3M Company, St. Paul, MN.

In some embodiments, a UV-C shield described herein is useful in disinfection devices (e.g., chambers). A UV-C disinfection device, cabinet, or enclosure comprises a UV-C light source illuminating the interior of the device and the contents of the device with UV-C light. The UV-C disinfection device can be, for example, square, rectangular, conical, parabolic, elliptical, spherical, or a combination of shapes, and is more effective with a UV-C reflector applied to the interior surface. UV reflection on the interior surface tends to minimize absorption of the UV-C light before it is absorbed by the microbes it is intended for. The UV-C reflective interior surface can be, for example, non-transparent to visible light (e.g., aluminum, porous polytetrafluoroethylene (PTFE), or porous barium sulfate) or a UV-C shield that is transparent to visible light as described herein. The UV-C shield can also be, for example, a window for viewing the contents in a UV-C disinfection device where the remainder of the interior walls of the UV-C disinfection device are covered with a non-transparent UV-C reflector (e.g., aluminum or porous PTFE). The UV-C disinfection device is useful, for example, for disinfecting medical instruments, hygiene articles, air, liquids (e.g., water or beverages), filter media, food preparation devices, and porous membranes.

In another aspect, the present disclosure describes a blue light shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident blue light over at least a 30-nanometer wavelength reflection bandwidth in a wavelength range from at least 400 nm to 500 nm. Such a blue light shield is useful, for example, for curing of dental adhesives while protecting dentists from blue light.

In some embodiments, a blue light shield described herein is useful in disinfection devices (e.g., chambers). A blue light shield disinfection device, cabinet, or enclosure comprises a blue light source illuminating the interior of the device and the contents of the device with blue light. The blue disinfection device can be, for example, square, rectangular, conical, parabolic, elliptical, spherical, or a combination of shapes, and is more effective with a blue light reflector applied to the interior surface. blue light reflection on the interior surface tends to minimize absorption of the blue light before it is absorbed by the microbes it is intended for. The blue reflective interior surface can be, for example, non-transparent to visible light (e.g., aluminum, porous polytetrafluoroethylene (PTFE), or porous barium sulfate) or a blue light shield that is transparent to visible light as described herein. The blue light shield can also be, for example, a window for viewing the contents in a blue light disinfection device where the remainder of the interior walls of the blue light disinfection device are covered with a non-transparent blue light reflector (e.g., aluminum or porous PTFE). The blue light disinfection device is useful, for example, for disinfecting medical instruments, hygiene articles, air, liquids (e.g., water or beverages), filter media, food preparation devices, and porous membranes.

In another aspect, the present disclosure describes a blue light collimator comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 percent of incident blue light over at least a 30-nanometer wavelength reflection bandwidth in a wavelength range from at least 400 nanometers to 500 nanometers, wherein incident visible light transmission through at least the plurality of alternating first and second optical layers is greater than 30 percent over a 30-nanometer wavelength reflection bandwidth in a wavelength range from at least 500 nanometers to 750 nanometers.

In another aspect, the present disclosure describes a blue light concentrator comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 percent of incident blue light over at least a 30-nanometer wavelength reflection bandwidth in a wavelength range from at least 400 nanometers to 500 nanometers, wherein incident visible light transmission through at least the plurality of alternating first and second optical layers is greater than 30 percent over a 30-nanometer wavelength reflection bandwidth in a wavelength range from at least 500 nanometers to 750 nanometers.

In another aspect, the present disclosure describes a blue light curing device comprising a blue light shield comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, at least 400 to 550, 400 to 500 or even at least 450 to 550) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

In another aspect, the present disclosure describes a blue light curing device comprising a blue light collimator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, at least 400 to 550, 400 to 500, or even at least 450 to 550) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

In another aspect, the present disclosure describes a blue light curing device comprising a blue light concentrator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

DETAILED DESCRIPTION

Figure 1:
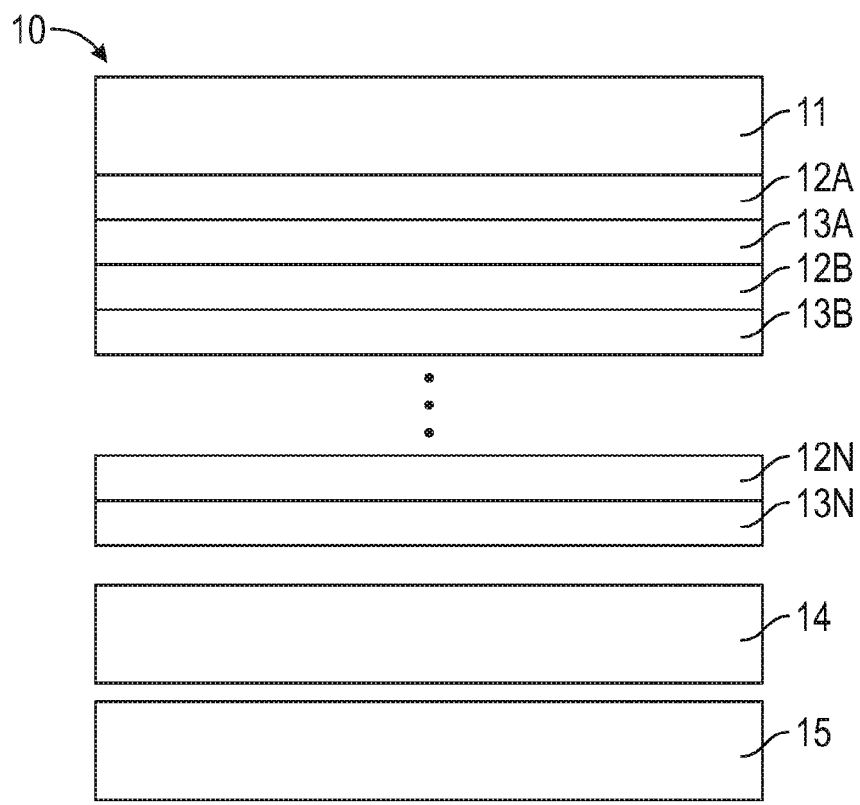
FIG. 1 is a schematic cross-sectional view of an exemplary assembly described herein.

In general, multilayer optical films described herein comprise at least 3 layers (typically in a range from 3 to 2000 total layers or more).

Some multilayer optical films described herein comprise at least a plurality of alternating first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident ultraviolet (UV) light (i.e., any light having a wavelength in a range from 100 to less than 400 nm) over at least a 30-nanometer wavelength reflection bandwidth in a wavelength range from at least 100 to 280 (in some embodiments, at least 180 to 280, or even at least 200 to 280) nm. In some embodiments, the multilayer optical film has a UV reflectivity greater than 90% (in some embodiments, greater than 99%), at least one of 222 nm, 254 nm, 265 nm, or 275 nm.

In some embodiments of multilayer optical films described herein, wherein incident visible light (i.e., any light having a wavelength in a range from 400 to less than 700 nm) transmission through at least the plurality of alternating first and second optical layers is greater than 30 (in some embodiments, greater than 40, 45, 50, 55, 60, 65, 70, 75, 80, 85, or even greater than 90) percent in a wavelength range from at least 400 to 750 (in some embodiments, at least 400 to 700, 500 to 700, or even at least 550 to 700) nm.

In some embodiments, multilayer optical films described herein have a UV transmission band edge in a range from 10 to 90 percent transmission spanning less than 20 (in some embodiments, less than 15, or even less than 10) nanometers.

Embodiments of multilayer optical films described herein, are useful, for example, in UV-C shield, UV-C light collimator, and UV-C light concentrator applications.

In some embodiments a first UV shield comprises fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 320 nm to less than 400 nm. In some embodiments, the first UV shield described herein has a UV reflectivity greater than 90 (in some embodiments, greater than 99) %, at least one of 325 nm, 365 nm, or 385 nm.

In some embodiments of first UV shields described herein, wherein incident visible light (i.e., any light having a wavelength in a range from 400 to less than 700 nm) transmission through at least the plurality of alternating first and second optical layers is at least 30 (in some embodiments, at least 40, 45, 50, 55, 60, 65, 70, 75, 80, 85, or even at least 90) percent in a wavelength range from at least at least 400 to 750 (in some embodiments, at least 400 to 700, 500 to 700, or even at least 550 to 700) nm.

In some embodiments, the first UV shield described herein has a UV transmission band edge in a range from 10 to 90 percent transmission spanning less than 20 (in some embodiments, less than 15, or even less than 10) nanometers.

In some embodiments, a second UV shield comprises fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 280 nm to less than 320 nm.

In some embodiments, the second UV shield described herein has a UV reflectivity greater than 90% (in some embodiments, greater than 99%) at 300 nm.

In some embodiments of the second UV shield described herein, wherein incident visible light (i.e., any light having a wavelength in a range from 400 to less than 700 nm) transmission through at least the plurality of alternating first and second optical layers is at least than 30 (in some embodiments, at least 40, 45, 50, 55, 60, 65, 70, 75, 80, 85, or even at least 90) (in some embodiments, greater than 55, 60, 65, 70, 75, 80, 85, or even greater than 90) percent in a wavelength range from at least at least 400 to 750 (in some embodiments, at least 400 to 700, 500 to 700, or even at least 550 to 700) nm.

In some embodiments, the second UV shield described herein has a UV transmission band edge in a range from 10 to 90 percent transmission spanning less than 20 (in some embodiments, less than 15, or even less than 10) nanometers.

In some embodiments, a third UV shield comprises fluoropolymer film and a multilayer optical film, the multilayer optical film comprises at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident UV light over at least a 30-nanometer wavelength reflection bandwidth in a wavelength range from at least 100 to less than 280 (in some embodiments, at least 180 to 280, or even at least 200 to 280) nm.

In some embodiments, the third UV shield described herein has a UV reflectivity greater than 90% (in some embodiments, greater than 99%), at least one of 222 nm, 254 nm, 265 nm, or 275 nm.

In some embodiments of the third UV shield described herein, wherein incident visible light (i.e., any light having a wavelength in a range from 400 to less than 700 nm) transmission through at least the plurality of alternating first and second optical layers is at least 30 (in some embodiments, at least 40, 45, 50, 55, 60, 65, 70, 75, 80, 85, or even at least 90) percent in a wavelength range from at least 400 to 750 (in some embodiments, at least 400 to 700, 500 to 700, or even at least 550 to 700) nm.

In some embodiments, the third UV shield described herein has a UV transmission band edge in a range from 10 to 90 percent transmission spanning less than 20 (in some embodiments, less than 15, or even less than 10) nanometers.

Exemplary UV-C multilayer optical films and UV-C shields described herein are flexible. Flexible UV-C multilayer optical films and UV-C shields can be wrapped around a rod not greater than 1 m (in some embodiments, not greater than 75 cm, 50 cm, 25 cm, 10 cm, 5 cm, or even not greater than 1 cm) in diameter without visibly cracking.

In some embodiments, a blue light shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 40, 45, 50, 55, 60, 65, 70, 75, 80, 85, or even at least 90) percent of incident blue light over at least a 30-nanometer wavelength reflection bandwidth in a wavelength range from at least 400 nm to 500 nm.

In some embodiments, the blue light shield described herein has a blue light reflectivity greater than 90% (in some embodiments, greater than 99%), of wavelengths in the range of 440 nm to 470 nm.

In some embodiments of blue light shields described herein, wherein incident visible light (i.e., any light having a wavelength in a range from 500 to less than 750 nm) transmission through at least the plurality of alternating first and second optical layers is at least 30 (in some embodiments, at least 40, 45, 50, 55, 60, 65, 70, 75, 80, 85, or even at least 90) percent in a wavelength range from at least at least 500 to 750 (in some embodiments, at least 500 to 700, or even at least 550 to 700) nm.

In some embodiments, blue light shields described herein have a light transmission band edge (transition from reflection to transmission) in a range from 10 to 90 percent transmission spanning less than 20 (in some embodiments, less than 15, or even less than 10) nanometers.

In some embodiments of multilayer optical films described herein, the at least first optical layer comprises polymeric material (e.g., at least one of polyvinylidene fluoride (PVDF), ethylene tetrafluoroethylene (ETFE)), and wherein the second optical layer comprises polymeric material (e.g., at least one of a copolymer (THV,) or a polyethylene copolymer comprising subunits derived from tetrafluoroethylene (TFE), hexafluoropropylene (HFP), and vinylidene fluoride (VDF), a copolymer (FEP) comprising subunits derived from tetrafluoro-ethylene (TFE) and hexafluoropropylene (HFP), or perfluoroalkoxy alkane (PFA)).

In some embodiments of multilayer optical films described herein, the at least first optical layer comprises inorganic material (e.g., at least one of titania, zirconia, zirconium oxynitride, hafnia, or alumina), and wherein the second optical layer comprises inorganic material (e.g., at least one of silica, aluminum fluoride, or magnesium fluoride). Exemplary materials are available, for example, from Materion Corporation, Mayfield Heights, OH, and Umicore Corporation, Brussels, Belgium.

Exemplary materials for making the optical layers that reflect blue light (e.g., the first and second optical layers) include polymers (e.g., polyesters, copolyesters, and modified copolyesters). In this context, the term "polymer" will be understood to include homopolymers and copolymers, as well as polymers or copolymers that may be formed in a miscible blend, for example, by coextrusion or by reaction, including transesterification. The terms "polymer" and "copolymer" include both random and block copolymers.

Polyesters suitable for use in some exemplary multilayer optical films constructed according to the present disclosure generally include dicarboxylate ester and glycol subunits and can be generated by reactions of carboxylate monomer molecules with glycol monomer molecules. Each dicarboxylate ester monomer molecule has two or more carboxylic acid or ester functional groups and each glycol monomer molecule has at least two hydroxy functional groups. The dicarboxylate ester monomer molecules may all be the same or there may be two or more different types of molecules. The same applies to the glycol monomer molecules. Also included within the term "polyester" are polycarbonates derived from the reaction of glycol monomer molecules with esters of carbonic acid.

Examples of suitable dicarboxylic acid monomer molecules for use in forming the carboxylate subunits of the polyester layers include 2,6-naphthalene dicarboxylic acid and isomers thereof; terephthalic acid; isophthalic acid; phthalic acid; azelaic acid; adipic acid; sebacic acid; norbornenedicarboxylic acid; bi-cyclo-octane dicarboxylic acid; 1,4-cyclohexanedicarboxylic acid and isomers thereof; t-butylisophthalic acid, trimellitic acid, sodium sulfonated isophthalic acid; 4,4'-biphenyl dicarboxylic acid and isomers thereof; and lower alkyl esters of these acids, such as methyl or ethyl esters. The term "lower alkyl" refers, in this context, to C1-C10 straight-chain or branched alkyl groups.

Examples of suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclooctanediol; trimethylolpropane; pentaerythritol; 1,4-benzenedimethanol and isomers thereof; Bisphenol A; 1,8-dihydroxybiphenyl and isomers thereof; and 1,3-bis(2-hydroxyethoxy)benzene.

Another exemplary birefringent polymer useful for the reflective layer(s) is polyethylene terephthalate (PET), which can be made, for example, by reaction of terephthalic dicarboxylic acid with ethylene glycol. Its refractive index for polarized incident light of 550 nm wavelength increases when the plane of polarization is parallel to the stretch direction from about 1.57 to as high as about 1.69. Increasing molecular orientation increases the birefringence of PET. The molecular orientation may be increased by stretching the material to greater stretch ratios and holding other stretching conditions fixed. Copolymers of PET (CoPET), such as those described in U.S. Pat. No. 6,744,561 (Condo et al.) and U.S. Pat. No. 6,449,093 (Hebrink et al.), the disclosures of which are incorporated herein by reference, are particularly useful for their relatively low temperature (typically less than 250° C.) processing capability making them more coextrusion compatible with less thermally stable second polymers. Other semicrystalline polyesters suitable as birefringent polymers include polybutylene terephthalate (PBT), and copolymers thereof such as those described in U.S. Pat. No. 6,449,093 (Hebrink et al.) and U.S. Pat. Pub. No. 2006/0084780 (Hebrink et al.), the disclosures of which are incorporated herein by reference. Another useful birefringent polymer is syndiotactic polystyrene (sPS).

First optical layers can also be isotropic high refractive index layers comprising at least one of poly(methyl methacrylate), copolymers of polypropylene; copolymers of polyethylene, cyclic olefin copolymers, cyclic olefin block copolymers, polyurethanes, polystyrenes, isotactic polystyrene, atactic polystyrene, copolymers of polystyrene (e.g., copolymers of styrene and acrylate), polycarbonates, copolymers of polycarbonates, miscible blends of polycarbonates and copolyesters, or miscible blends of poly(methyl methacrylate) or poly(vinylidene fluoride Second optical layers can also comprise fluorinated copolymers materials such as at least one of fluorinated ethylene propylene copolymer (FEP); copolymers of tetrafluorethylene, hexafluoropropylene, and vinylidene fluoride (THV); copolymers of tetrafluoroethylene, hexafluoropropylene, or ethylene. Particularly useful are melt processible copolymers of tetrafluoroethylene and at least two, or even at least three, additional different comonomers.

Exemplary melt processible copolymers of tetrafluoroethylene and other monomers discussed above include those available as copolymers of tetrafluoroethylene, hexafluoropropylene, and vinylidene fluoride under the trade designations "DYNEON THV 220," "DYNEON THV 230," "DYNEON THV 2030," "DYNEON THV 500," "DYNEON THV 610," and "DYNEON THV 815" from Dyneon LLC, Oakdale, MN; "NEOFLON EFEP" from Daikin Industries, Ltd., Osaka, Japan; "AFLAS" from Asahi Glass Co., Ltd., Tokyo, Japan; and copolymers of ethylene and tetrafluoroethylene available under the trade designations "DYNEON ET 6210A" and "DYNEON ET 6235" from Dyneon LLC; "TEFZEL ETFE" from E.I. duPont de Nemours and Co., Wilmington, DE; and "FLUON ETFE" by Asahi Glass Co., Ltd.

In addition, the second polymer can be formed from homopolymers and copolymers of polyesters, polycarbonates, fluoropolymers, polyacrylates, and polydimethylsiloxanes, and blends thereof.

Other exemplary polymers, for the optical layers, especially for use in the second layer, include homopolymers of polymethylmethacrylate (PMMA), such as those available, for example, from Ineos Acrylics, Inc., Wilmington, DE, under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt. % methylmethacrylate (MMA) monomers and 25 wt. % ethyl acrylate (EA) monomers, (available, for example, from Ineos Acrylics, Inc., under the trade designation "PERSPEX CP63" or Arkema, Philadelphia, PA, under the trade designation "ATOGLAS 510"), a CoPMMA formed with MMA comonomer units and n-butyl methacrylate (nBMA) comonomer units, or a blend of PMMA and poly(vinylidene fluoride) (PVDF).

Additional suitable polymers for the optical layers include polyolefin copolymers such as poly (ethylene-co-octene) (PE-PO) available, for example, under the trade designation "ENGAGE 8200" from Dow Elastomers, Midland, MI; polyethylene methyl acrylate also available, for example, under the trade designation "ELVALOY 1125" from Dow, Midland, MI; poly (propylene-co-ethylene) (PPPE) available, for example, under the trade designation "Z9470" from Atofina Petrochemicals, Inc., Houston, TX; and a copolymer of atactic polypropylene (aPP) and isotatctic polypropylene (iPP). The multilayer optical films can also include in the second layers, a functionalized polyolefin (e.g., linear low-density polyethylene-graft-maleic anhydride (LLDPE-g-MA) such as that available, for example, under the trade designation "BYNEL 4105" from E.I. duPont de Nemours & Co., Inc.).

The selection of the polymer combinations used in creating the multilayer optical film depends, for example, upon the desired bandwidth that will be reflected. Higher refractive index differences between the first optical layer polymer and the second optical layer polymer create more optical power thus enabling more reflective bandwidth. Alternatively, additional layers may be employed to provide more optical power. Exemplary combinations of birefringent layers and second polymer layers may include, for example, the following: PET/THV, PET/SPDX, PET/CoPMMA, CoPEN/PMMA, CoPEN/SPDX, sPS/SPDX, sPS/THV, CoPEN/THV, PET/blend of PVDF/PMMA, PET/fluoropolymers, sPS/fluoroelastomers, and CoPEN/fluoropolymers.

Exemplary material combinations for making the optical layers that reflect UV light (e.g., the first and second optical layers) include PMMA (e.g., first optical layers)/THV (e.g., second optical layers), PMMA (e.g., first optical layers)/blend of PVDF/PMMA (e.g., second optical layers), PC (polycarbonate) (e.g., first optical layers)/PMMA (e.g., second optical layers), PC (polycarbonate) (e.g., first optical layers)/blend of PMMA/PVDF (e.g., second optical layers), copolyethylene (e.g., polyethylene methyl acrylate) (e.g., first optical layers)/THV (e.g., second optical layers), blend of PMMA/PVDF (e.g., first optical layers)/blend of PVDF/PMMA (e.g., second optical layers) and PET (e.g., first optical layers)/CoPMMA (e.g., second optical layers).

Exemplary material for making the optical layers that absorb UV light, or blue light, include COC, EVA, TPU, PC, PMMA, CoPMMA, siloxane polymers, fluoropolymers, THV, PET, PVDF or blends of PMMA and PVDF.

A UV absorbing layer (e.g., a UV protective layer) aids in protecting the visible/IR-reflective optical layer stack from UV-light caused damage/degradation over time by absorbing UV-light (e.g., any UV-light) that may pass through the UV-reflective optical layer stack. In general, the UV-absorbing layer(s) may include any polymeric composition (i.e., polymer plus additives), including pressure-sensitive adhesive compositions, that is capable of withstanding UV-light for an extended period of time.

LED UV light, in particular the ultraviolet radiation from 280 to 400 nm, can induce degradation of plastics, which in turn results in color change and deterioration of optical and mechanical properties. Inhibition of photo-oxidative degradation is important for outdoor applications wherein long-term durability is mandatory. The absorption of UV-light by polyethylene terephthalates, for example, starts at around 360 nm, increases markedly below 320 nm, and is very pronounced at below 300 nm. Polyethylene naphthalates strongly absorb UV-light in the 310 to 370 nm range, with an absorption tail extending to about 410 nm, and with absorption maxima occurring at 352 nm and 337 nm. Chain cleavage occurs in the presence of oxygen, and the predominant photooxidation products are carbon monoxide, carbon dioxide, and carboxylic acids. Besides the direct photolysis of the ester groups, consideration has to be given to oxidation reactions, which likewise form carbon dioxide via peroxide radicals.

A UV absorbing layer may protect the multilayer optical film by reflecting UV light, absorbing UV light, scattering UV light, or a combination thereof. In general, a UV absorbing layer may include any polymer composition that is capable of withstanding UV radiation for an extended period of time while either reflecting, scattering, or absorbing UV radiation. Examples of such polymers include PMMA, CoPMMA, silicone thermoplastics, fluoropolymers, and their copolymers, and blends thereof. An exemplary UV absorbing layer comprises PMMA/PVDF blends.

A variety of optional additives may be incorporated into an optical layer to make it UV absorbing. Examples of such additives include at least one of an ultra violet absorber(s), a hindered amine light stabilizer(s), or an anti-oxidant(s).

Particularly desirable UV absorbers are red shifted UV absorbers (RUVA) which absorb at least 70% (in some embodiments, at least 80%, or even greater than 90%) of the UV light in the wavelength region from 180 nm to 400 nm. Typically, it is desirable if the RUVA is highly soluble in polymers, highly absorptive, photo-permanent and thermally stable in the temperature range from 200° C. to 300° C. for extrusion process to form the protective layer. The RUVA can also be highly suitable if they can be copolymerizable with monomers to form protective coating layer by UV curing, gamma ray curing, e-beam curing, or thermal curing processes.

RUVAs typically have enhanced spectral coverage in the long-wave UV region, enabling it to block the high wavelength UV light that can cause yellowing in polyesters. Typical UV protective layers have thicknesses in a range from 13 micrometers to 380 micrometers (0.5 mil to 15 mils) with a RUVA loading level of 2-10 wt. %. One of the most effective RUVA is a benzotriazole compound, 5-trifluoromethyl-2-(2-hydroxy-3-alpha-cumyl-5-tert-octylphenyl)-2H-benzotriazole (available under the trade designation "CGL-0139" from BASF, Florham Park, NJ). Other exemplary benzotriazoles include 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole. Further exemplary RUVAs includes 2(-4,6-diphenyl-1-3,5-triazin-2-yl)-5-hexyloxy-phenol. Other exemplary UV absorbers include those available from BASF under the trade designations "TINUVIN 1577," "TINUVIN 900," "TINUVIN 1600," and "TINUVIN 777." Other exemplary UV absorbers are available, for example, in a polyester master batch under the trade designation "TA07-07 MB" from Sukano Polymers Corporation, Dunkin, SC. An exemplary UV absorber for polymethylmethacrylate is a masterbatch available, for example, under the trade designation "TA11-10 MBO1" from Sukano Polymers Corporation. An exemplary UV absorber for polycarbonate is a masterbatch from Sukano Polymers Corporation, under the trade designations "TA28-09 MB01." In addition, the UV absorbers can be used in combination with hindered amine light stabilizers (HALS) and anti-oxidants. Exemplary HALS include those available from BASF, under the trade designation "CHIMASSORB 944" and "TINUVIN 123." Exemplary anti-oxidants include those obtained under the trade designations "IRGANOX 1010" and "ULTRANOX 626", also available from BASF.

In some embodiments, the first optical layer is a fluoropolymer and the second optical layer is a fluoropolymer. Examples of the materials that are desirable for such embodiments include ETFE/THV, PMMA/THV, PVDF/FEP, ETFE/FEP, PVDF/PFA, and ETFE/PFA. In one exemplary embodiment, THV available, for example, under the trade designation "DYNEON THV 220 GRADE" or "DYNEON THV 2030 GRADE" or "DYNEON THV 815 GRADE" from Dyneon LLC, Oakdale, MN, are employed as the second optical layer with PMMA as the first optical layer for multilayer UV mirrors reflecting 320-400 nm. In another exemplary embodiment, THV available, for example, under the trade designation "DYNEON THV 220 GRADE" or "DYNEON THV 2030 GRADE" or "DYNEON THV 815 GRADE" from Dyneon LLC are employed as the second optical layer with "ELVALOY 1125" available from Dow, Midland, MI, as the first optical layer.

Other additives may be included in a UV absorbing layer (e.g., a UV protective layer). Small particle non-pigmentary zinc oxide and titanium oxide can also be used as blocking or scattering additives in a UV absorbing layer. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. U.S. Pat. No. 5,504,134 (Palmer et al.), the disclosure of which is incorporated herein by reference, describes attenuation of polymer substrate degradation due to ultraviolet radiation through the use of metal oxide particles in a size range of about 0.001 to about 0.2 micrometer (in some embodiments, about 0.01 micrometer to about 0.15) micrometer in diameter. U.S. Pat. No. 5,876,688 (Laundon), the disclosure of which is incorporated herein by reference, describes a method for producing micronized zinc oxide that are small enough to be transparent when incorporated as UV blocking and/or scattering agents in paints, coatings, finishes, plastic articles, cosmetics and the like which are well suited for use in the present invention. These fine particles such as zinc oxide and titanium oxide with particle size ranged from 10 nm-100 nm that can attenuate UV radiation are available, for example, from Kobo Products, Inc., South Plainfield, NJ Flame retardants may also be incorporated as an additive in a UV protective layer.

In addition to adding UV absorbers, HALS, nano-scale particles, flame retardants, antimicrobials, wetting agents, and anti-oxidants to a UV absorbing layer, the UV absorbers, HALS, nano-scale particles, flame retardants, and anti-oxidants can be added to the multilayer optical films, and any optional durable top coat layers. Fluorescing molecules and optical brighteners can also be added to a UV absorbing layer, the multilayer optical layers, an optional hardcoat layer, or a combination thereof. Blue light absorbing dyes or pigments are available, for example, from Clariant Specialty Chemicals, Charlotte, NC under the trade designation "PV FAST YELLOW," and can be added to the skin layers or top coat. In an exemplary embodiment, antimicrobial agents, and wetting agents, can be added to the skin layer and they would migrate to the surface exposed to the air. A wetting agent may be necessary to prevent condensation fogging.

Antimicrobials preferably have little or no absorbance in the UV-C region of 200 nm to 300 nm, and may be selected from metals, metal oxides, cationic surfactants free of aromatic groups, cationic antimicrobial polymers, antimicrobial lipids, and alkyl carboxylic acids and alkyl carboxylate ester carboxylic acids. The antimicrobial also may be generated in-situ by exposure to the UV light. Silver is also known to be an effective antiseptic and has been used in creams to treat wounds and other topical infections. The active form of silver is the ion Ag+. Similarly, copper and zinc have antimicrobial activity and it is believed that the ion is the active component ($Cu^{2+}$, $Zn^{2+}$). These ions may be delivered from a variety of salts and complexes including silver zeolites; inorganic silver salts (e.g., silver nitrate, silver chloride, silver sulfate, silver thiosulfate, silver phosphate, silver alkyl, silver aryl, and silver aralkyl carboxylates (exemplary carboxylate anions have less than about 8 carbon atoms (e.g., acetate, lactate, salicylate, and gluconate salts)), silver oxide, colloidal silver, nanocrystalline silver, silver coated microspheres, silver complexed with various polymers as well as silver delivered from dendrimers as described, for example, in U.S. Pat. No. 6,579,906 (Cooper et al.) and U.S. Pat. No. 6,224,898 (Balogh et al.), the disclosures of which are incorporated herein by reference; and silver antimicrobial complexes (e.g., silver sulfadiazine)). The silver may optionally be complexed with primary, secondary, tertiary, and quaternary amines as well as polymeric forms thereof, and silver protein complexes. Similarly, these same salts and complexes of copper or zinc may be used (e.g., copper chloride, zinc chloride, etc.). Those compounds of this class that may be, for example, vacuum deposited may be coated on the external surface of the device as described U.S. Pat. No. 9,393,350 (McGrath et al.), the disclosure of which is incorporated herein by reference. Antimicrobial polymers comprising quaternary amine or protonated primary, secondary, or tertiary amine groups may also be used as the antiseptic. Preferably for UV stability the cationic antimicrobial polymer is a polyquaternary amine. These are typically polymers having quaternary amine groups with at least one alkyl or aralkyl chain of at least 6 carbon atoms, and preferably as least 8 carbon atoms. The polymers may be linear, branched, hyperbranched or dendrimers. Exemplary antimicrobial polymeric quaternary amine polymers include those described in U.S. Pat. No. 6,440,405 (Cooper et. al.), U.S. Pat. No. 5,408,022 (Imazato et al.), and U.S. Pat. No. 5,084,096 (Stovicek); PCT Pub. No. WO/02102244, published Dec. 27, 2002; and *Disinfection, Sterilization and Preservation*, S. Block, 4$^{th}$ ed., 1991, Chapter 13, Lea & Febiger, the disclosures of which are incorporated herein by reference.

A particularly preferred class of polymeric protonated amine antiseptic compounds are polybiguanides. Compounds of this class are represented by the formula:

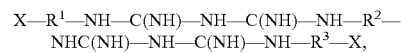

where $R^1$, $R^2$, and $R^3$ are bridging groups such as polymethylene groups (in some embodiments, having 2 to 10, 4 to 8, or even 6 methylene groups). The methylene groups can be optionally substituted in available positions with halogen, hydroxyl, or phenyl groups. X is a terminal group and is typically an amine, amine salt, or a dicyandiamide group. A preferred compound of this class is polyhexamethylene biguanide (PHMB) (available, for example, under the trade designation "COSMOCIL CQ" from Avecia, Wilmington, DE).

Antimicrobial cationic surfactants can also be used. This class of compounds typically comprise at least one quaternary ammonium groups, wherein attached to the quaternary ammonium group is at least one C6-C18 linear or branched alkyl chain. Suitable compounds include those disclosed in *Disinfection, Sterilization and Preservation*, S. Block, 4$^{th}$ ed., 1991, Chapter 13, Lea & Febiger. Particularly preferred compounds of this class have one or two C8-C18 alkyl or aralkyl chains and may be represented by the following formula:

where $R^1$ and $R^2$ are C1-C18 linear or branched alkyl, alkaryl chains that may be substituted in available positions by N, O, or S provided at least one $R^1$ or $R^2$ is a C8-C18 linear or branched alkyl chains that may be substituted in available positions by N, O, or S. $R^3$ and $R^4$ are C1-C6 alkyl groups. $R^3$ and $R^4$ may also form a ring (e.g., a pyridine ring with the nitrogen of the quaternary ammonium group). X is an anion, preferably a halide, and most preferably Cl— or Br—. Other anions may include methosulfate, ethosulfate, and phosphates. Preferred compounds of this class include monoalkyltrimethylammonium salts, monoalkyldimethylbenzyl ammonium salts, dialkyldimethyl ammonium salts, benzethonium chloride, and octenidine.

Examples of preferred quaternary ammonium antiseptics include dimethyldialkylammonium halides where the alkyl groups have chain lengths of C8-C18, an example of which is available under the trade designation "BARQUAT 4250" from Lonza, Allendale, NJ A mixture of chain lengths (e.g., a mixture of dioctyl, dilauryl, and dioctadecyl) may be particularly useful. Exemplary compounds include quaternary ammonium salts (available, for example, under the trade designations "BARDAC 2050," "BARDAC 205M," and "BARDAC 2250" from Lonza; cetylpyridinium halides (e.g., cetylpyridinium chloride (available, for example, under the trade designation "CEPACOL CHLORIDE" from Merrell Labs, Kansas City, MO); and octenidine.

Desirably, the outermost layer includes at least one antiseptic at a suitable level to produce the desired result. Such compositions preferably include a total amount of antiseptic of at least 0.2 (in some embodiments, at least 0.25, 0.3, 0.35, 0.4, 0.45, 0.5, 0.75, 1, 2, or even at least 3) wt. %, based on the total weight of the outermost layer. Alternatively, the antiseptic can be coated onto the outermost layer.

Additional antiseptics for use with those described herein include peroxides, C6-C14 alkyl carboxylic acids and alkyl ester carboxylic acids, antimicrobial natural oils, and compatible combinations thereof (see, e.g., U.S. Pat. Pub. No. US 2006/0051384 A1 (Scholz et al.)), the disclosure of which is incorporated herein by reference; and diphenyl ethers, phenols, halogenated phenols, bisphenols, resorcinols and its derivatives, anilides, and combinations thereof (see, e.g., U.S. Pat. Pub. No. US2006/0052452 A1 (Scholz)), the disclosure of which is incorporated herein by reference.

In some embodiments, external layers exhibit surface structures (e.g., engineered structures) that reduce or prevent bacterial adhesion. Exemplary engineered structures are described in U.S. Pat. Pub. Nos. 2013/0211310 (Bommarito et al.) and 2018/0171157 (Magin et al.), the disclosures of which are incorporated herein. The surface topography may be integral with or affixed to an exterior surface of the article. The engineered surface has a topography comprising at least one pattern or arrangement, which can typically be defined by a plurality of unit cells. Each unit cell comprises at least one engineered structure protruding from or projected into that surface. The engineered structure may be a microstructure or a nanostructure. Each engineered structure can have further directed nanofeatures, typically possessing smaller dimensions, protruding therefrom. In some embodiments, the engineered structures include a base having at least one dimension of at least one cross section not less than 0.5 micrometer and no greater than 50 micrometers. The pitch between adjacent engineered structures is typically at least the smallest dimension of the structure and may be no greater than 5 times said smallest dimension. Surface topographies according to the disclosure resist bioadhesion as compared to a surface without such topography. Surface topographies according to the invention can be created by affixing a film or other substrate containing the plurality of microstructures and nanostructures to the external surface of the multilayer optical stack or by microreplicating the structural features directly to the surface of the article. When microreplicated, the resulting structures will be monolithically integrated with the underlying article. In other embodiments, the engineered structures can be created by photolithography. As a final optional step, surface energy modifying coating may be applied to the engineered surface. For example, a low surface energy coating may be desired.

A low surface energy coating may generally be understood as a coating that, on a flat surface, has a water contact angle of greater than 110°. Such a coating may not be necessary to achieve highly hydrophobic performance. Exemplary low surface energy coating materials that may be used may include materials such as hexafluoropropylene oxide (HFPO), or organosilanes (e.g., alkylsilane, alkoxysilane, acrylsilanes, polyhedral oligomeric silsequioxane (POSS) and fluorine-containing organosilanes). A number of other suitable low surface energy coatings may also be used to further enhance the hydrophobicity of the film. Examples of particular coatings known in the art include those described in U.S. Pat. Pub. Nos. 2008/0090010 (Zhang et al.), and 2007/0298216 (Jing et al.), the disclosures of which are incorporated herein by reference. Where a coating is applied to the microstructures, it may be applied by any appropriate coating method, such as sputtering, vapor deposition, spin coating, dip coating, roll-to-roll coating, or any other number of suitable methods.

Also contemplated are top or external coating or layers which control biofilm and bacterial adhesion. Exemplary coatings include those described in U.S. Pat. Pub. No. 2008/0075960 (Pocius et al.), the disclosure of which is incorporated herein by reference. The curable composition comprises a polymer derived from ethylenically unsaturated units having pendent long-chain aliphatic groups, ethylenically unsaturated units having pendent poly(oxyalkylene) groups, and ethylenically unsaturated units having pendent substrate-reactive groups, and a crosslinking agent.

In some embodiments, the antiseptics include an effective amount of an antimicrobial lipid antiseptic comprising a (C7-C14) saturated fatty acid ester of a polyhydric alcohol, a (C8-C22) unsaturated fatty acid ester of a polyhydric alcohol, a (C7-C14) saturated fatty ether of a polyhydric alcohol, a (C8-C22) unsaturated fatty ether of a polyhydric alcohol, C8-C14 alkylcarboxylates, and C5-C12 1,2 alkane diol. Alkoxylated derivatives thereof, wherein the alkoxylated derivative has less than 5 moles of alkoxide per mole of polyhydric alcohol also may be used; with the proviso that for polyhydric alcohols other than sucrose, the esters comprise monoesters and the ethers comprise monoethers, and for sucrose the esters comprise monoesters, diesters, or combinations thereof, and the ethers comprise monoethers, diethers, or combinations thereof. Useful antiseptics of this class are further described, for example, in U.S. Pat. No. 7,582,681 (Schmaus et al.) and U.S. Pat. No. 8,512,723 (Scholz et al.), the disclosures of which are incorporated herein by reference.

An exemplary class of antimicrobial antiseptics comprise C6-C14 alkyl carboxylic acids and alkyl carboxylate ester carboxylic acids, which include C6-C14 (in some embodiments, C8-C12) straight chain or branched alkyl carboxylic acids (e.g., heptanoic, carpic, caprylic, undecylenic, and lauric acids). These are often referred to as fatty acids. As used herein the term "fatty" includes both even and odd number of carbon atoms in alkyl acids which may be linear or branched. Also included are C8-C22 mono- or polyunsaturated fatty acids. Examples include oleic, linoleic, linolenic, and arachidonic acids. For UV stability, preferably the alkyl carboxylate is saturated. Also included within this class are esters of these carboxylic acids with hydroxyfunctional alkyl acids (alkyl carboxylate esters of carboxylic acids) such as lauroyl lactylate, caproyl lactylate, or caproyl lactylate. The alkyl carboxylate ester carboxylic acids comprise a C6-C14 (in some embodiments, C8-C12) alkyl group. Most conveniently, these are formed by esterification of a C6-C14 saturated linear or branched alkylcarboxylic acid or a C8-C22 mono- or polyunsaturated fatty acid with a hydroxyfunctional alkyl carboxylic acid. A commercially available example of an alkyl carboxylate ester of an alkyl carboxylic acid is caproyl lactylate marketed under the trade designation "PATIONIC 122A" from RITA Corp., Crystal Lake, IL Another exemplary compound of this class is lauroyl lactylate. Singlet oxygen is a potent antimicrobial and may be generated in-situ by exposing a suitable photosensitizer to light of the appropriate wavelength. In one embodiment the photosensitizer is titanium dioxide (e.g., the anatase form) which is applied to or incorporated in the external surface which is illuminated with UV light (200-320 nm). The photosensitizer is preferably applied by any suitable means such as vacuum deposition. Other photosensitizers and application methods are described in U.S. Pat. No. 7,569,181 (Curry et al.), the disclosure of which is incorporated herein by reference.

A UV-C shield, concentrator or collimator may also comprise modified surface chemistry including protein-binding or functionalized probes for immobilizing broad group or target microbes. Example applications include but are not limited to allergen removal and pathogen-specific quarantine clearing zones.

The desired thickness of a UV protective layer is typically dependent upon an optical density target at specific wavelengths as calculated by Beers Law. In some embodiments, the UV protective layer has an optical density greater than 3.5, 3.8, or 4 at 380 nm, greater than 1.7 at 390 nm, and greater than 0.5 nm at 400 nm. Those of ordinary skill in the art recognize that the optical densities typically should remain fairly constant over the extended life of the article in order to provide the intended protective function.

The UV protective layer, and any optional additives, may be selected to achieve the desired protective functions such as UV protection. Those of ordinary skill in the art recognize that there are multiple means for achieving the noted objectives of the UV protective layer. For example, additives that are very soluble in certain polymers may be added to the composition. Of particular importance, is the permanence of the additives in the polymer. The additives should not degrade or migrate out of the polymer. Additionally, the thickness of the layer may be varied to achieve desired protective results. For example, thicker UV protective layers would enable the same UV absorbance level with lower concentrations of UV absorbers, and would provide more UV absorber permanence attributed to less driving force for UV absorber migration. One mechanism for detecting the change in physical characteristics is the use of the weathering cycle described in ASTM G155-05a (October 2005) and a D65 light source operated in the reflected mode. Under the noted test, and when the UV protective layer is applied to the article, the article should withstand an exposure of at least 18,700 kJ/m2 at 340 nm before the b* value obtained using the CIE L*a*b* space increases by 5 or less, 4 or less, 3 or less, or 2 or less before the onset of significant cracking, peeling, delamination, or haze.

An exemplary UV-C protective layer is a cross-linked fluoropolymer. The fluoropolymer may be cross-linked with electron beam irradiation. The cross-linked fluoropolymer layer can have a cross-link density gradient with a high cross-link density at its first surface and a lower cross-link at its second surface. Cross-link density gradients can be achieved low electron beam voltages in the range from 50 kV to 150 kV.

Another exemplary UV-C protective layer is a cross-linked silicone polymer. The cross-linked silicone polymer can also comprise nano-silica particles and silsequioxane particles. An exemplary cross-linked silicone polymer coating comprising nano-silica particles is available under the trade designation "GENTOO" from Ulta-Tech International, Inc., Jacksonville, FL.

Multilayer optical films described herein can be made using general processing techniques, such as those described in U.S. Pat. No. 6,783,349 (Neavin et al.), the disclosure of which is incorporated herein by reference.

Desirable techniques for providing a multilayer optical film with a controlled spectrum include the use of an axial rod heater control of the layer thickness values of coextruded polymer layers as described, for example, in U.S. Pat. No. 6,783,349 (Neavin et al.); timely layer thickness profile feedback during production from a layer thickness measurement tool such as an atomic force microscope (AFM), a transmission electron microscope, or a scanning electron microscope; optical modeling to generate the desired layer thickness profile; and repeating axial rod adjustments based on the difference between the measured layer profile and the desired layer profile.

The basic process for layer thickness profile control involves adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure is repeated until the two profiles converge.

The layer thickness profile (layer thickness values) of multilayer optical film described herein reflecting at least 50 percent of incident UV light over a specified wavelength range can be adjusted to be approximately a linear profile with the first (thinnest) optical layers adjusted to have about a ¼ wave optical thickness (index times physical thickness) for 100 nm light and progressing to the thickest layers which would be adjusted to be about ¼ wave thick optical thickness for 280 nm light.

Dielectric mirrors, with optical thin film stack designs comprised of alternating thin layers of inorganic dielectric materials with refractive index contrast, are particularly suited for this. In recent decades they are used for applications in UV, Visible, NIR and IR spectral regions. Depending upon the spectral region of interest, there are specific materials suitable for that region. Also, for coating these materials, one of two forms of physical vapor deposition (PVD) are used: evaporation or sputtering. Evaporated coatings rely upon heating the coating material (evaporant) to a temperature at which it evaporates. This is followed by condensation of the vapor upon a substrate. For evaporated dielectric mirror coatings, the electron-beam deposition process is most commonly used. Sputtered coatings use energetic gas ions to bombard a material ("target") surface, ejecting atoms which then condense on the nearby substrate. Depending upon which coating method is used, and the settings used for that method, thin film coating rate and structure-property relationships will be strongly influenced. Ideally, coating rates should be high enough to allow acceptable process throughput and film performance, characterized as dense, low stress, void free, non-optically absorbing coated layers.

Exemplary embodiments can be designed to have peak reflectance at 254 nm, by both PVD methods. For example, coating discrete substrates by electron-beam deposition method, using $HfO_2$ as the high refractive index material and $SiO_2$ as the low refractive index material. Mirror design has alternating layers of "quarter wave optical thickness" (qwot) of each material, that are coated, layer by layer until, for example, after 13 layers the reflectance at 254 nm is >99%. The bandwidth of this reflection peak is around 80 nm. Quarter wave optical thickness is the design wavelength, here 254 nm, divided by 4, or 63.5 nm. Physical thickness of the high refractive index layers ($HfO_2$) is the quotient of qwot and refractive index of $HfO_2$ at 254 nm (2.41), or 30.00 nm. Physical thickness of the low refractive index layers ($MgF_2$), with 254 nm refractive index at 1.41, is 45.02 nm. Coating a thin film stack, then, which is comprised of alternating layers of $HfO_2$ and $SiO_2$ and designed to have peak reflectance at 254 nm begins by coating layer 1 $HfO_2$ at 30.00 nm. In electron beam deposition a four-hearth evaporation source is used. Each hearth is cone-shaped and 17 $cm^3$ volume of $HfO_2$ chunks fill it. The magnetically deflected high voltage electron beam is raster scanned over the material surface as filament current of the beam is steadily, in a pre-programmed fashion, increased. Upon completion of the pre-programmed step the $HFO_2$ surface is heated to evaporation temperature, about 2500° C., and a source shutter opens, the $HfO_2$ vapor flux emerging from the source in a cosine-shaped distribution and condensing upon the substrate material above the source. For enhancement of coating uniformity, the substrate holders rotate during deposition. Upon reaching the prescribed coating thickness (30.00 nm) the filament current shuts off; the shutter closes and the $HfO_2$ material cools. For layer 2 the evaporation source is then rotated to a hearth containing chunks of $MgF_2$ and a similar pre-programmed heating process begins. Here, the $MgF_2$ surface temperature is about 950° C. when the source shutter opens and, upon reaching the prescribed coating thickness (45.02 nm), the filament current shuts off; the shutter closes and the $HfO_2$ material cools. This stepwise process is continued, layer by layer, until the total number of design layers is reached. With this optical design, as total layers are increased, from 3 to 13, the resulting peak reflectance increases accordingly, from 40% at 3 layers to >99% at 13 layers.

In another exemplary embodiment, UV transparent films can be coated in continuous roll to roll (R2R) fashion, using ZrON as the high refractive index material and $SiO_2$ as the low refractive index material. The optical design is the same type of thin film stack, alternating qwot layers of the two materials. For ZrON, with refractive index at 254 nm of 2.25, the physical thickness target was 28.22 nm. For $SiO_2$, here sputtered from an aluminum-doped silicon sputter target, with refractive index 1.49, the target thickness was 42.62 nm. Layer one ZrON is DC sputtered from a pure zirconium sputter target in a gas mixture of argon, oxygen and nitrogen. Whereas argon is the primary sputtering gas, oxygen and nitrogen levels are set to achieve transparency, low absorptance and high refractive index. The film roll transport initially starts at a pre-determined speed, and the sputter source power is ramped to full operating power, followed by introduction of the reactive gases and then achieving steady state condition. Depending upon the length of film to coat, the process continues until total footage is achieved. Here, as the sputter source is orthogonal to and wider than the film which is being coated, the uniformity of coating thickness is quite high. Upon reaching the desired length of coated film the reactive gases are set to zero and the target is sputtered to a pure Zr surface state. The film direction is next reversed and silicon (aluminum doped) rotary pair of sputter targets has AC frequency (40 kHz) power applied in an argon sputtering atmosphere. Upon reaching steady state, oxygen reactive gas is introduced to provide transparency and low refractive index. At the predetermined process setting and line speed the second layer is coated over the length which was coated for layer one. Again, as these sputter sources are also orthogonal to and wider than the film being coated, the uniformity of coating thickness is quite high. After reaching the desired length of coated film the reactive oxygen is removed and the target is sputtered in argon to a pure silicon (aluminum doped) surface state. Layers three to five or seven or nine or eleven or thirteen, depending upon peak reflectance target, are coated in this sequence. Upon completion, the film roll is removed for post-processing.

For manufacturing of these inorganic coatings, the electron beam process is best suited for coating discrete parts. Though some chambers have demonstrated R2R film coating, the layer by layer coating sequence would still be necessary. For R2R sputtering of film, it is advantageous to use a sputtering system with multiple sources located around one, or perhaps two, coating drums. Here, for a thirteen layers optical stack design, a two, or even single, machine pass process, with alternating high and low refractive index layers coated sequentially, would be feasible. How many machine passes needed would be contingent upon machine design, cost, practicality of thirteen consecutive sources, and so forth. Additionally, coating rates would need to be matched to a single film line speed.

In some embodiments, multilayer optical films described herein do not have an increase in UV-C light absorption after exposure to at least 151,108,800 $mJ/cm^2$ of UV-C light at 254 nm as tested using the "UV-C Service Life Test" described in the Examples.

Embodiments of multilayer optical films described herein, are useful, for example, in UV-C shield (e.g., a UV-C shield comprising a multilayer optical film described herein), UV-C light collimator (e.g., a UV-C light collimator comprising a multilayer optical film described herein), and UV-C light concentrator applications (e.g., a UV-C light concentrator comprising a multilayer optical film described herein).

A UV-C shield, concentrator or collimator may be used to disinfect a porous membrane or filter. A membrane is a thin, flexible sheet-like structure that serves to selectively separate two environments or components within. They can be made up of single or multiple layers. Porous membranes and filters allow filtration/removal of microbes from air and water. UV-C shields can protect membrane and filter material from UV-C light, and UV-C concentrators or collimators may be used to disinfect membrane/filter materials, increasing lifetime and/or performance.

In some embodiments, a UV-C shield described herein is useful in disinfection devices (e.g., chambers). A UV-C disinfection device, cabinet, or enclosure comprises a UV-C light source illuminating the interior of the device and the contents of the device with UV-C light. The UV-C disinfection device can be, for example, square, rectangular, conical, parabolic, elliptical, spherical, or a combination of shapes, and is more effective with a UV-C reflector applied to the interior surface. UV reflection on the interior surface tends to minimize absorption of the UV-C light before it is absorbed by the microbes it is intended for. The UV-C reflective interior surface can be, for example, non-transparent to visible light (e.g., aluminum, porous polytetrafluoroethylene (PTFE), or porous barium sulfate) or a UV-C shield that is transparent to visible light as described herein. The UV-C shield can also be, for example, a window for viewing the contents in a UV-C disinfection device where the remainder of the interior walls of the UV-C disinfection device are covered with a non-transparent UV-C reflector (e.g., aluminum or porous PTFE). The UV-C disinfection device is useful, for example, for disinfecting medical instruments, hygiene articles, air, liquids (e.g., water or beverages), filter media, food preparation devices, and porous membranes.

A UV-C shield, concentrator or collimator may be used to disinfect a food preparation device. A food preparation device can be a surface, a cutting device, a mixing device, or even a cooking device. UV-C shields can protect food preparation surfaces from UV-C light. UV-C concentrators and UV-C collimators may be used to disinfect food preparation devices.

A UV-C shield, concentrator or collimator may be used to disinfect a wound. UV-C disinfection of wounds can provide non-contact disinfection. UV-C shields can protect wound bandage material from UV-C light. UV-C concentrators or collimators may be used to disinfect wounds before, during, or after surgery.

Referring to FIG. 1, exemplary assembly 10 is an ultraviolet mirror film comprising a UV-C transparent protective layer 11 over first optical layers 12A, 12B, 12N, second optical layers 13A, 13B, 13N, optional adhesive layer 14, and optional substrate 15 to be protected from UV.

Figure 2:
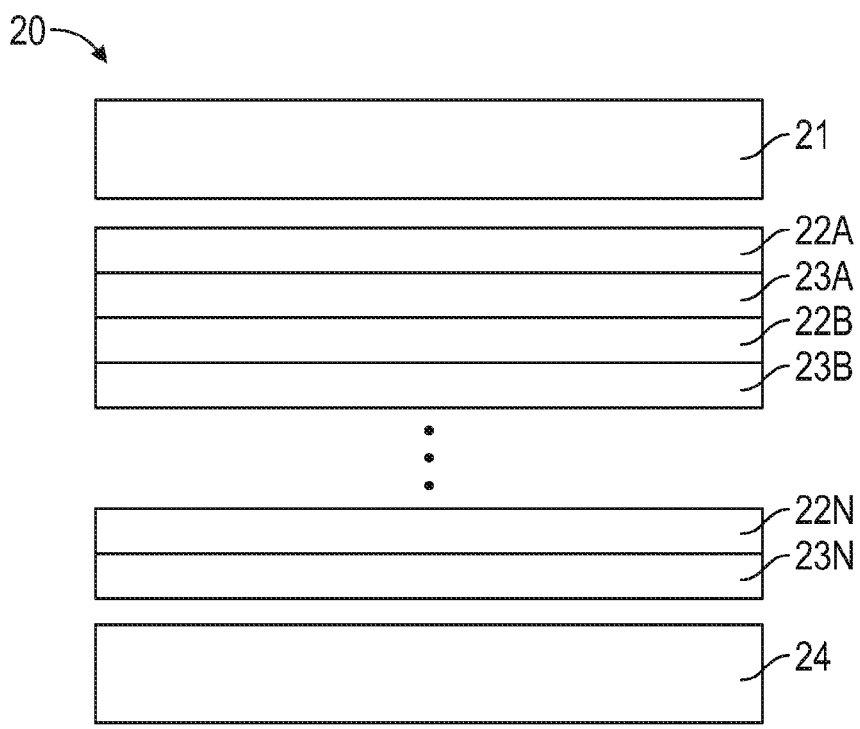
FIG. 2 is a schematic cross-sectional view of an exemplary multilayer optical film used in exemplary assemblies described herein.

Referring to FIG. 2, exemplary multilayer optical film 20 comprises UV-C transparent protective layer 21 over first optical layers 22A, 22B, 22N, second optical layers 23A, 23B, 23N, and optional adhesive layer 24.

Figure 3:
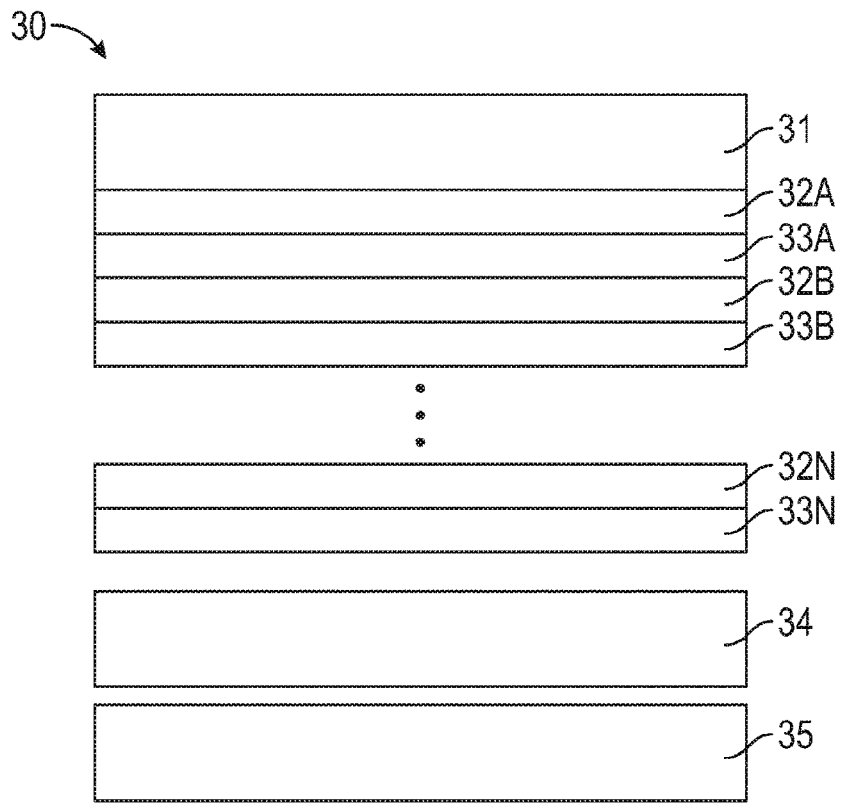
FIG. 3 is a schematic cross-sectional view of an exemplary light shield comprising a transparent UV mirror or transparent blue mirror.

Referring to FIG. 3, exemplary optical assembly 30 comprises blue light absorbing skin layer 31, blue reflective transparent reflector having first optical layers 32A, 32B, 32N, second optical layers 33A, 33B, 33N, optional second skin layer 34, and optional adhesive layer 35.

In some embodiments, a mechanical filter comprises the multilayer optical film described herein. For example, a liquid (e.g., water) filter with the multilayer optical film as a viewing window, or air filter using the multilayer optical film to reflect UV-C light.

A blue light shield, concentrator or collimator may be used to disinfect a porous membrane or filter. A membrane is a thin, flexible sheet-like structure that serves to selectively separate two environments or components within. They can be made up of single or multiple layers. Porous membranes and filters allow filtration/removal of microbes from air and water. Blue light shields can protect membrane and filter material from blue light, and blue light concentrators or collimators may be used to disinfect membrane/filter materials, increasing lifetime and/or performance.

Embodiments of multilayer optical films described herein, are useful, for example, in a blue light shield (e.g., a blue light shield comprising a multilayer optical film described herein), a blue light collimator (e.g., a blue light collimator comprising a multilayer optical film described herein), and a blue light concentrator application (e.g., a blue light concentrator comprising a multilayer optical film described herein).

A blue light shield, concentrator or collimator may be used to disinfect a food preparation device. A food preparation device can be a surface, a cutting device, a mixing device, or even a cooking device. Blue light shields can protect food preparation surfaces from blue light. Blue light concentrators and blue light collimators may be used to disinfect food preparation devices.

A blue light shield, concentrator or collimator may be used to disinfect a wound. Blue light disinfection of wounds can provide non-contact disinfection. Blue light shields can protect wound bandage material from blue light. Blue light concentrators or collimators may be used to disinfect wounds before, during, or after surgery.

In some embodiments, a blue light shield described herein is useful in disinfection devices (e.g., chambers). A blue light shield disinfection device, cabinet, or enclosure comprises a blue light source illuminating the interior of the device and the contents of the device with blue light. The blue disinfection device can be, for example, square, rectangular, conical, parabolic, elliptical, spherical, or a combination of shapes, and is more effective with a blue light reflector applied to the interior surface. blue light reflection on the interior surface tends to minimize absorption of the blue light before it is absorbed by the microbes it is intended for. The blue reflective interior surface can be, for example, non-transparent to visible light (e.g., aluminum, porous polytetrafluoroethylene (PTFE), or porous barium sulfate) or a blue light shield that is transparent to visible light as described herein. The blue light shield can also be, for example, a window for viewing the contents in a blue light disinfection device where the remainder of the interior walls of the blue light disinfection device are covered with a non-transparent blue light reflector (e.g., aluminum or porous PTFE). The blue light disinfection device is useful, for example, for disinfecting medical instruments, hygiene articles, air, liquids (e.g., water or beverages), filter media, food preparation devices, and porous membranes.

A blue light curing device can comprise a blue light shield comprising a multilayer optical film comprising at least a plurality of alternating first and second optical layers collectively reflecting at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

A blue light curing device can comprise a blue light collimator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 30, 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, 500 to 700, or even at least 550 to 700) nm.

A blue light curing device can comprise a blue light concentrator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

A blue light disinfection device can comprise a blue light collimator a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

EXEMPLARY EMBODIMENTS

1A. A multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident ultraviolet (UV) light (i.e., any light having a wavelength in a range from 100 to less than 400 nm) over at least a 30-nanometer wavelength reflection bandwidth in a wavelength range from at least 100 to 280 (in some embodiments, at least 180 to 280, or even at least 200 to 280) nm.

2A. The multilayer optical film of Exemplary Embodiment 1A having a UV reflectivity greater than 90% at at least one of 222 nm, 254 nm, 265 nm, or 275 nm.

3A. The multilayer optical film of any preceding A Exemplary Embodiment, wherein incident visible light (i.e., any light having a wavelength in a range from 400 to less than 750 nm) transmission through at least the plurality of alternating first and second optical layers is at least 30 (in some embodiments, at least 35, 40, 45, 50, 55, 60, 65, 70, 75, 80, 85, or even at least 90) percent in a wavelength range from at least at least 400 to 750 (in some embodiments, at least 400 to 700, or even at least 500 to 700) nm.

4A. The multilayer optical film of any preceding A Exemplary Embodiment having a UV transmission band edge in a range from 10 to 90 percent transmission spanning less than 20 (in some embodiments, less than 15, or even less than 10) nanometers.

5A. The multilayer optical film of any preceding A Exemplary Embodiment, wherein the at least first optical layer comprises at least one polyethylene copolymer, and wherein the second optical layer comprises at least one of a copolymer comprising tetrafluoroethylene, hexafluoropropylene, and vinylidene fluoride, a copolymer comprising tetrafluoro-ethylene and hexafluoropropylene, or perfluoroalkoxy alkane.

6A. The multilayer optical film of any preceding A Exemplary Embodiment, wherein the at least first optical layer comprises at least one of titania, zirconia, zirconium oxynitride, hafnia, or alumina, and wherein the second optical layer comprises at least one of silica, aluminum fluoride, or magnesium fluoride.

7A. The multilayer optical film of any preceding A Exemplary Embodiment that does not have an increase in UV-C light absorption after exposure to at least 151,108,800 mJ/cm$^2$ of UV-C light at 254 nm.

8A. The multilayer optical film of any preceding A Exemplary Embodiment that can be wrapped around a rod not greater than 1 m (in some embodiments, not greater than 75 cm, 50 cm, 25 cm, 10 cm, 5 cm, or even not greater than 1 cm) in diameter without visibly cracking.

1B. A UV-C shield comprising the multilayer optical film of any preceding A Exemplary Embodiment.

2B. The UV-C shield of Exemplary Embodiment 1B having a major surface having at least one of a protein-binding or functionalized probes for immobilizing broad group or target microbes.

3B. A graphic film comprising any preceding B Exemplary Embodiment.

4B. A UV-C food preparation device comprising any preceding B Exemplary Embodiment.

1C. A porous membrane comprising the multilayer optical film of any preceding A Exemplary Embodiment.

1D. A mechanical filter comprising the multilayer optical film of any preceding A Exemplary Embodiment.

2D. A UV-C air filtration device comprising any preceding D Exemplary Embodiment.

3D. A UV-C wound disinfection device comprising any preceding D Exemplary Embodiment.

1E. A UV-C light collimator comprising the multilayer optical film of any preceding A Exemplary Embodiment.

2E. The UV-C light collimator of Exemplary Embodiment 1E having a major surface having at least one of a protein-binding or functionalized probes for immobilizing broad group or target microbes.

1F. A UV-C light concentrator comprising the multilayer optical film of any preceding A Exemplary Embodiment.

1G. A UV-C disinfection device comprising the multilayer optical film of any preceding A Exemplary Embodiment.

1H. A UV shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident UV light over at least a 30-nanometer wavelength range in a wavelength reflection bandwidth from at least 320 nm to less than 400 nm.

2H. The UV shield of Exemplary Embodiment 1H having a UV reflectivity greater than 90% at at least one of 325 nm, 365 nm, or 385 nm.

3H. The UV shield of any preceding H Exemplary Embodiment, wherein incident visible light (i.e., any light having a wavelength in a range from 400 to less than 750 nm) transmission through at least the plurality of alternating first and second optical layers is at least 30 (in some embodiments, at least 35, 40, 45, 50, 55, 60, 65, 70, 75, 80, 85, or even at least 90) percent in a wavelength range from at least at least 400 to 750 (in some embodiments, at least 400 to 700, or even at least 500 to 700) nm.

4H. The UV shield UV shield of any preceding H Exemplary Embodiment having a UV transmission band edge in a range from 10 to 90 percent transmission spanning less than 20 (in some embodiments, less than 15, or even less than 10) nanometers.

5H. The UV shield of any preceding H Exemplary Embodiment, wherein the at least first optical layer comprises at least one of titania, zirconia, zirconium oxy nitride, hafnia, or alumina, and wherein the second optical layer comprises at least one of silica, aluminum fluoride, or magnesium fluoride.

1I. A UV shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 50 percent of incident UV light over at least a 30-nanometer wavelength reflection bandwidth in a wavelength range from at least 280 nm to less than 320 nm.

2I. The UV shield of Exemplary Embodiment 1I having a UV reflectivity greater than 90% at 300 nm.

3I. The UV shield of any preceding I Exemplary Embodiment, wherein incident visible light (i.e., any light having a wavelength in a range from 400 to less than 750 nm) transmission through at least the plurality of alternating first and second optical layers is at least 30 (in some embodiments, at least 35, 40, 45, 50, 55, 60, 65, 70, 75, 80, 85, or even at least 90) percent in a wavelength range from at least at least 400 to 700 (in some embodiments, at least 400 to 700, or even at least 500 to 700) nm.

4I. The UV shield of any preceding I Exemplary Embodiment having a UV transmission band edge in a range from 10 to 90 percent transmission spanning less than 20 (in some embodiments, less than 15, or even less than 10) nanometers.

5I. The UV shield of any preceding I Exemplary Embodiment, wherein the at least first optical layer comprises at least one of titania, zirconia, zirconium oxynitride, hafnia, or alumina, and wherein the second optical layer comprises at least one of silica, aluminum fluoride, or magnesium fluoride.

1J. A UV shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident UV light over at least a 30-nanometer wavelength reflection bandwidth in a wavelength range from at least 100 to less than 280 (in some embodiments, 180 to 280, 200 to 280, or even at least 200 to 280) nm.

2J. The UV shield of Exemplary Embodiment 1J having a UV reflectivity greater than 90% at at least one of 222 nm, 254 nm, 265 nm, or 275 nm.

3J. The UV shield of any preceding J Exemplary Embodiment, wherein incident visible light (i.e., any light having a wavelength in a range from 400 to less than 750 nm) transmission through at least the plurality of alternating first and second optical layers is greater than 50 (in some embodiments, greater than 55, 60, 65, 70, 75, 80, 85, or even greater than 90) percent in a wavelength range from at least at least 400 to 750 (in some embodiments, at least 400 to 700, or even at least 500 to 700) nm.

4J. The UV shield of any preceding J Exemplary Embodiment having a UV transmission band edge in a range from 10 to 90 percent transmission spanning less than 20 (in some embodiments, less than 15, or even less than 10) nanometers.

5J. The UV shield of any preceding J Exemplary Embodiment, wherein the at least first optical layer comprises at least one of titania, zirconia, zirconium oxynitride, hafnia, or alumina, and wherein the second optical layer comprises at least one of silica, aluminum fluoride, or magnesium fluoride.

6J. The UV shield of any preceding J Exemplary Embodiment comprising an antimicrobial.

7J. The UV shield of any preceding J Exemplary Embodiment comprising surface structures (e.g., surface structures that reduce or prevent bacterial adhesion).

8J. A UV-C disinfection device comprising a UV-C shield of any of Exemplary Embodiments 1J to 7J.

9J. A porous membrane comprising a UV-C shield of any of Exemplary Embodiments 1J to 7J.

10J. A mechanical filter comprising a UV-C shield of any of Exemplary Embodiments 1J to 7J.

11J. A UV-C shield of any of Exemplary Embodiments 1J to 7J having a major surface having at least one of a protein-binding or functionalized probes for immobilizing broad group or target microbes.

12J. A UV-C concentrator comprising any of the preceding J Exemplary Embodiment.

1K. A blue light shield comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light over at least a 30-nanometer wavelength reflection bandwidth in a wavelength range from at least 400 nm to 500 nm.

2K. The blue light shield of Exemplary Embodiment 1K having a blue light reflectivity greater than 90% at 450 nm.

3K. The blue light shield of any preceding K Exemplary Embodiment, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

4K. The blue light shield of any preceding K Exemplary Embodiment having a light transmission band edge (i.e., transition from reflection to transmission) in a range from 10 to 90 percent transmission spanning less than 20 (in some embodiments, less than 15, or even less than 10) nanometers.

5K. The blue light shield of any preceding K Exemplary Embodiment, wherein the at least first optical layer comprises at least one of titania, zirconia, zirconium oxynitride, hafnia, or alumina, and wherein the second optical layer comprises at least one of silica, aluminum fluoride, or magnesium fluoride.

6K. A blue light curing device comprising the blue light shield of any preceding K Exemplary Embodiment.

1L. A blue light collimator comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 percent of incident blue light over at least a 30-nanometer wavelength reflection bandwidth in a wavelength range from at least 400 nanometers to 500 nanometers, wherein incident visible light transmission through at least the plurality of alternating first and second optical layers is greater than 30 percent over a 30-nanometer wavelength reflection bandwidth in a wavelength range from at least 500 nanometers to 750 nanometers.

2L. A blue light curing device comprising the blue light collimator of Exemplary Embodiment 1L.

1M. A blue light concentrator comprising fluoropolymer film and a multilayer optical film comprising at least a plurality of alternating first and second optical layers comprising at least one inorganic material, the first and second optical layers collectively reflecting at at least one of 0°, 30°, 45°, 60°, or 75° incident light angle at least 30 percent of incident blue light over at least a 30-nanometer wavelength reflection bandwidth in a wavelength range from at least 400 nanometers to 500 nanometers, wherein incident visible light transmission through at least the plurality of alternating first and second optical layers is greater than 30 percent over a 30-nanometer wavelength reflection bandwidth in a wavelength range from at least 500 nanometers to 750 nanometers.

2M. A blue light curing device comprising the blue light concentrator of Exemplary Embodiment 1M.

1N. A blue light curing device comprising a blue light shield comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

10. A blue light curing device comprising a blue light collimator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 30, 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, 500 to 700, or even at least 550 to 700) nm.

1P. A blue light curing device comprising a blue light concentrator comprising a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

1Q. A blue light disinfection device comprising a blue light collimator a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

1R. A blue light disinfection device comprising a blue light concentrator a multilayer optical film comprising at least a plurality of alternating first and second optical layers collectively reflecting at at least one of 0°, 30°, 45°, 60°, or 75° incident light angle at least 30 (in some embodiments, at least 35, 40, 45, 50, 55, 60, 65, 70, 75, 80, 85, or even at least 90) percent of incident blue light (i.e., any light having a wavelength in a range from 400 to less than 500 nm) over at least a 30-nanometer wavelength reflection bandwidth in a wavelength range from at least 400 to 600 (in some embodiments, 400 to 550, or even at least 400 to 500) nm, wherein incident visible light (i.e., any light having a wavelength in a range from 550 to less than 750 nm) transmission through at least the plurality of alternating first and second optical layers is at least 30 (in some embodiments, at least 35, 40, 45, 50, 55, 60, 65, 70, 75, 80, 85, or even at least 90) (in some embodiments, greater than 55, 60, 65, 70, 75, 80, 85, or even greater than 90) percent in a wavelength reflection bandwidth from at least at least 500 to 750 (in some embodiments, at least 500 to 700, or even at least 550 to 700) nm.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

—UV-C Service Life Test

UV-C service life was determined with an enclosure made of aluminum having a 118V RRD-30-8S germicidal fixture manufactured by Atlantic Ultraviolet Corporation, Hauppauge, NY The fixture contains eight high output instant start 254 nm UV-C lamps. Compressed air was run across the length of the lamps at a pressure of 124 kPa (18 psi) to maintain a constant temperature and minimize temperature-induced loss of lamp output intensity. Test samples were mounted onto aluminum slides containing a window of appropriate size to conduct absorbance measurements using a spectrophotometer) (obtained under the trade designation "SHIMADZU 2550 UV-VIS" from Shimadzu, Kyoto, Japan). Continuous light exposures were conducted for discrete time intervals, with removal for absorbance measurement every 100 hours, and placed back into the exposure chamber. Samples were placed within the test chamber at a controlled height from and distance along the lamps throughout the duration of experiments. A UV radiometer (obtained under the trade designation "UVPAD" from OPSYTECH Corporation, Makati City, Philippines) was placed within the chamber in line with test samples to gather UV (and specifically UV-C) irradiance and dosage data every 100 hours throughout the exposure process.

Example 1

Figure 4:
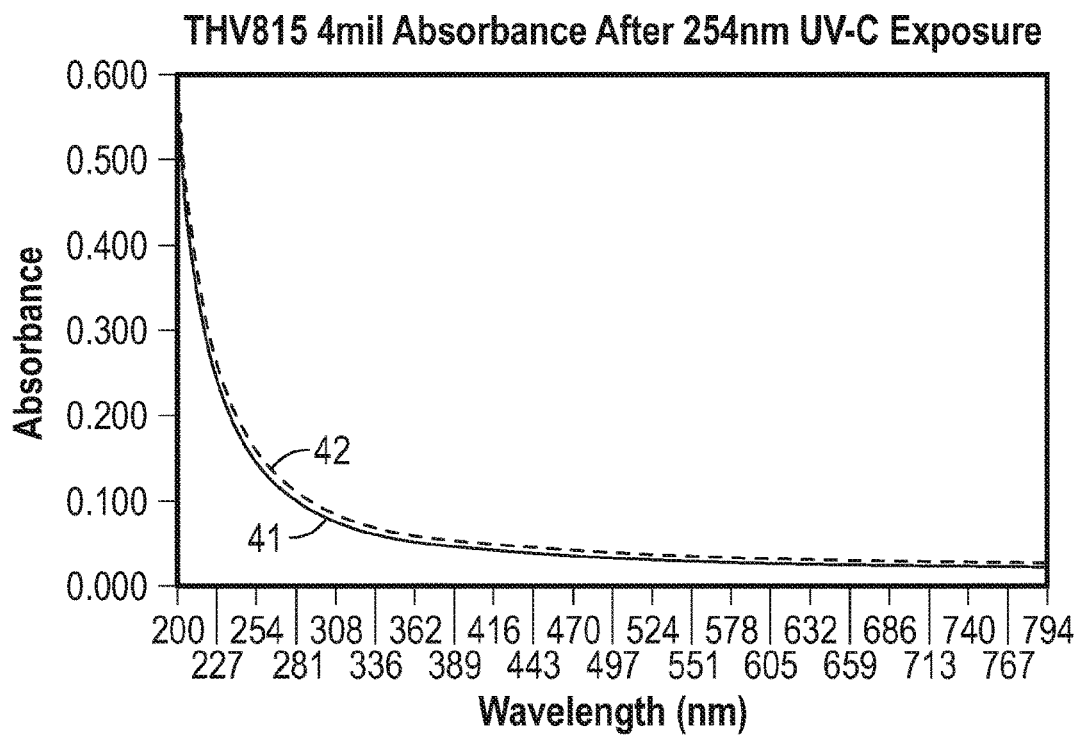
FIG. 4 is a graph of measured absorbance spectra of exemplary fluoropolymer film described herein.

Fluoropolymer (available under the trade designation "THV815GZ" from Dyneon, Oakdale, MN) was extruded with a 40 mm twin screw extruder and a flat film extrusion die onto a film casting wheel chilled to 21° C. (70° F.) to create a 100-micrometer thick fluoropolymer ("THV815") film. Film absorbance spectra of the fluoropolymer ("THV815") film was measured per the UV-C service life test and initial spectra 41 is shown in FIG. 4. The fluoropolymer ("THV815") film was then exposed to 254 nm light as described in UV-C Service Life Test Method for 1588 hours for a total dose of 105,108,800 mj/cm$^2$. After exposure, the fluoropolymer ("THV815") film absorbance spectra was again measured per the UV-C service life test and the absorbance spectra 42 is shown in FIG. 4.

Modeled Example I

Figure 5:
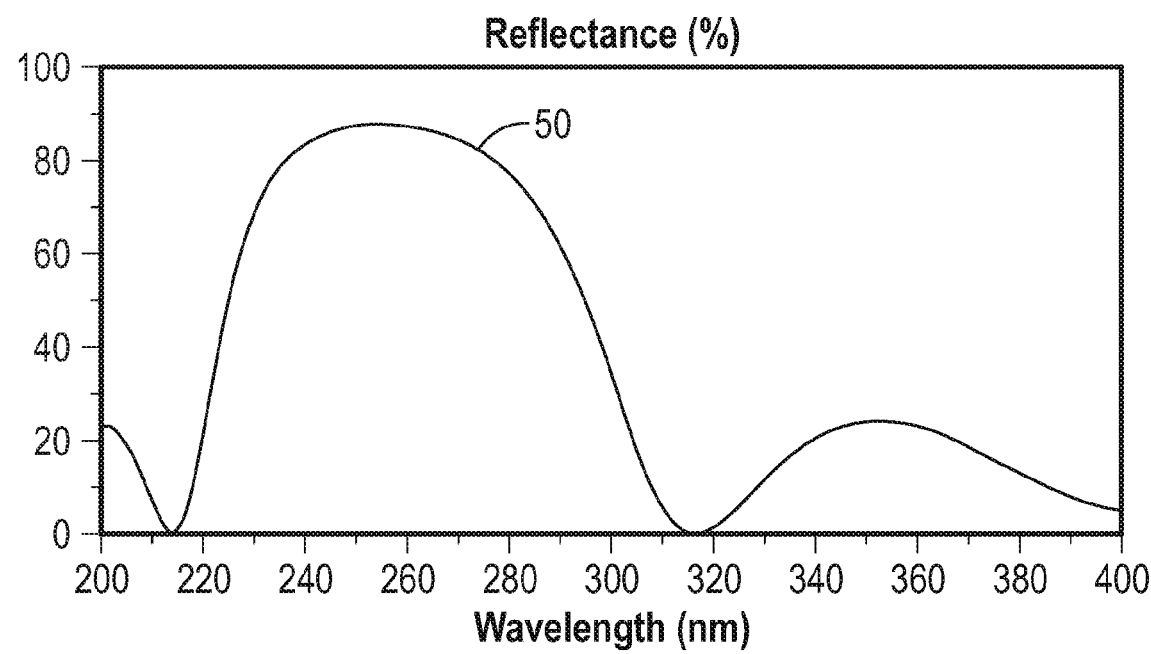
FIG. 5 is a graph of modeled reflection spectra of exemplary multilayer optical film described herein.

The 4×4 matrix method using the Berreman algorithm was used for modeling the spectra of constructive and destructive interference generated from layer interfaces of materials having different refractive indices. The Berreman 4×4 matrix methodology is described in the Journal of the Optical Society of America (Volume 62, Number 4, April 1972) and the Journal of Applied Physics (Volume 85, Number 6, March 1999), the disclosures of which are incorporated herein by reference. Input parameters for this optical model were individual layer refractive indices, layer thicknesses, number of layers, and reflection bandwidth including a left band edge and a right band edge. The Berreman methodology calculated the percent light reflected at each layer interface and the percent light transmitted at each layer interface and outputs a reflection spectra and transmission spectra. The Berreman methodology was used to calculate % Reflectance spectra 50 shown in FIG. 5 of UV-C multilayer optical film having 10 alternating optical layers of HfO$_2$ high refractive index layers and SiO$_2$ low refractive index layers for a peak reflectance target of 254 nm.

Modeled Example II

Figure 6:
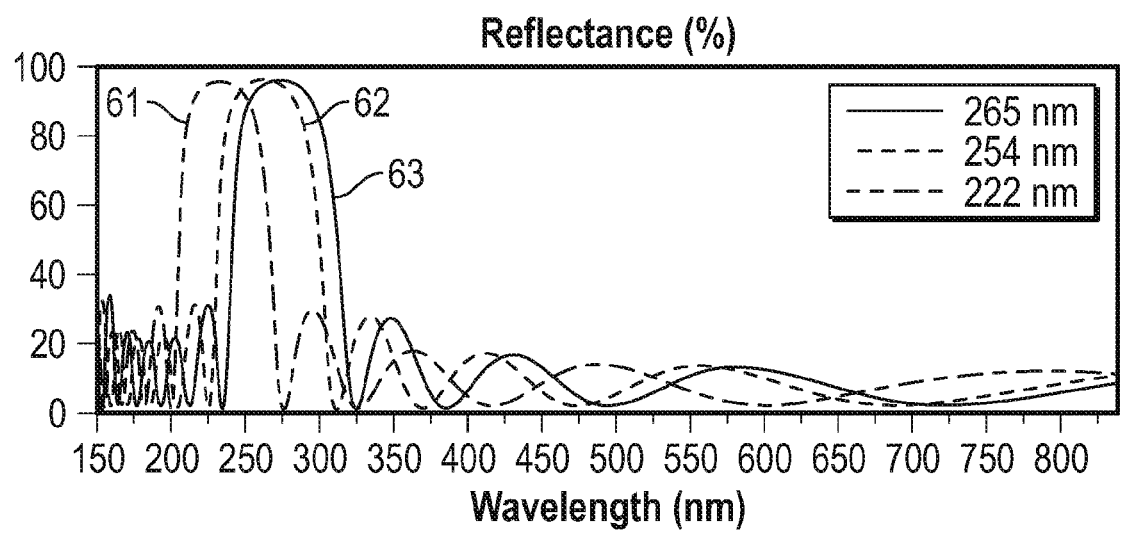
FIG. 6 is a graph of modeled reflection spectra of three different exemplary multilayer optical films described herein.

The Berreman methodology described in Example 2 was used to calculate % Reflectance spectra 61 shown in FIG. 6 for multilayer optical film with 11 alternating optical layers of HfO$_2$ high refractive index layers and SiO$_2$ low refractive index layers for reflectance spectra median target of 222 nm. % Reflectance spectra 62 was calculated for the same multilayer optical layers, but for a reflectance spectra median target of 254 nm. % Reflectance spectra 63 was calculated for the same multilayer optical layers, but for a reflectance spectra median target of 265 nm. % Reflectance spectra 64 was calculated for the same multilayer optical layers, but for a reflectance spectra median target of 275 nm.

Modeled Example III

Figure 7:
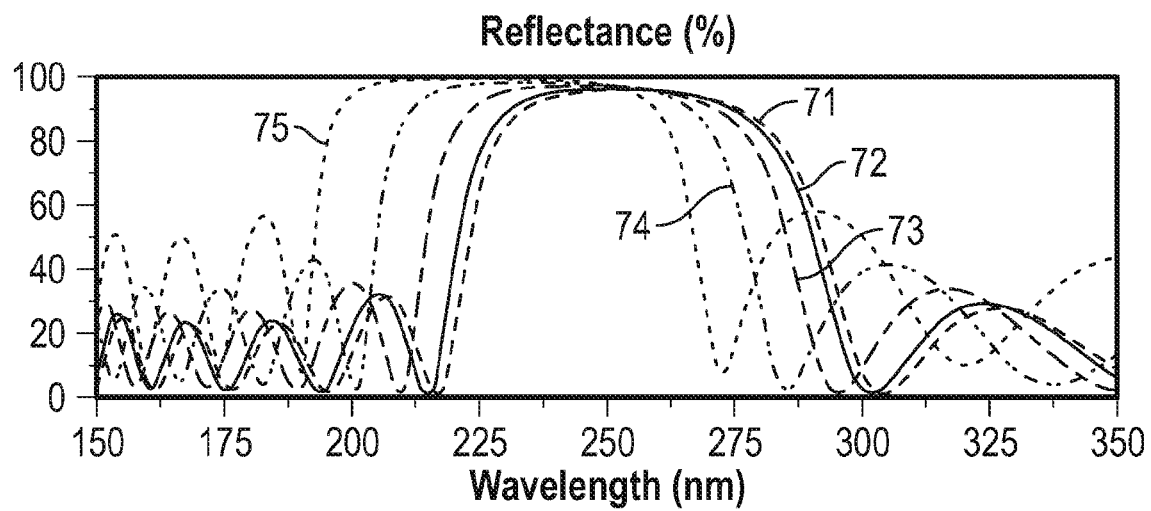
FIG. 7 is a graph of modeled reflection spectra of exemplary multilayer optical film showing shift in reflection spectra with changing incident light angle as described herein.

The Berreman methodology described in Example 2 was used to calculate % Reflectance spectra 71 shown in FIG. 7 for a multilayer optical film with 14 alternating optical layers of ZrON high refractive index layers and SiO$_2$ low refractive index layers for a median reflectance target of 254 nm at normal incident light angle (0°). % Reflectance spectra 72 was calculated for the same multilayer optical film, but for an incident light angle of 10°. % Reflectance spectra 73 was calculated for the same multilayer optical film, but for an incident light angle of 20°. % Reflectance spectra 74 was calculated for the same multilayer optical film, but for an incident light angle of 30°. % Reflectance spectra 75 was calculated for the same multilayer optical film, but for an incident light angle of 40°.

Example 2

Figure 8:
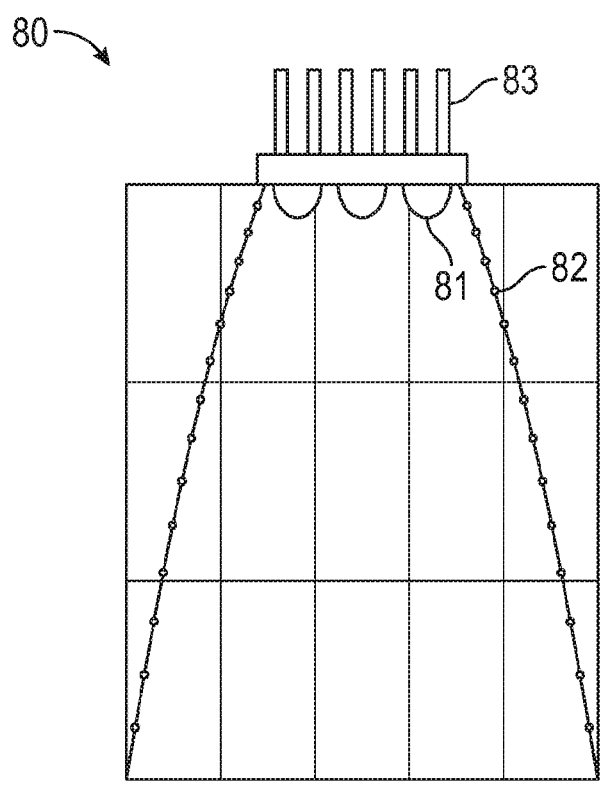
FIG. 8 is a schematic cross-sectional view of an exemplary light collimator design which transmits visible light while simultaneously collimating UV light or blue light.

Referring to FIG. 8, light collimator 80 having a parabolic reflective optical element 82 is shown. Light collimators can be designed to collimate light from a point source and can be collimated (focused) using a parabolic (elliptical) reflective optical element. The main requirements are that the source be located near the focal point of the optical element and that the source be relatively small compared with the size of the optical element. A 254 mm×254 mm (PETG) sheet (obtained under the trade designation "SPECTAR 14471" from Eastman, Kingsport, TN) having a thickness of 3175 micrometers (125 mils) was thermoformed into the parabolic optical element. In most applications, the optical element must be designed for practical considerations such as the cross-sectional area of the light emitting diode (LED) array and the allowed amount of space of the optical element. Given a source diameter Ds (width in 1D) and a design volume consisting of a height Hv and diameter Dv (width in 1D), it is possible to derive an equation for the shape of a near-optimum parabolic reflector:

$$y=a*(x+b)^2+\text{offset}$$

where $a=Hv/((Dv/2)^2-(Ds/2)^2)$, $b=-Dv/2$ and offset$=-a*(Ds/2)^2$;

Hv and/or Dv are selected such that the focus of the parabola coincides with the location of the light source at, which is achieved by choosing:

$$Hv=((Dv/2)^2-(Ds/2)^2)/Ds.$$

Here, x=Dv/2 and y=0. The calculated optical element is near optimal given the physical constraints of the system. Following the etendue conservation principle, the amount of collimation is proportional to $(Dv/Ds)^2$, with higher design volumes resulting is greater collimation. The cut-off angle of this optical element was given by:

$$\text{Theta}=+/-\text{atan}((Dv/2+Ds/2)/Hv).$$

A blue light reflective film created as described below was laminated to the parabolic optical element with optically clear adhesive (obtained under the trade designation "OCA8171" from 3M Company, St. Paul, MN). The blue light reflective film optical element included a multilayer optical film comprised first optical layers made with polyethyleneterephthalate (PET) (obtained under the trade designation "EASTAPAK 7452" from Eastman Chemical, Kingsport, TN) and second optical layers comprised copolyethylemethylmethacrylate (CoPMMA) (obtained under the trade designation "CP63" from Plaskolite, Columbus, OH). The PET and CoPMMA were coextruded through a multilayer melt manifold (feedblock) to form an optical stack of 275 layers. The layer thickness profile (layer thickness values) of this blue light reflective optical element was adjusted to be about a linear profile with the thinnest layers adjusted to have about a ¼ wave optical thickness (refractive index times physical thickness) for 450 nm light and progressing to the thickest layers which were adjusted to be about a ¼ wave optical thickness for 550 nm light when reflection was measured at a 0° incident light angle (normal angle). Layer thicknesses profile were adjusted to provide for improved spectral characteristics using the axial rod apparatus described in U.S. Pat. No. 6,783,349 (Neavin et al.), the disclosure of which is incorporated here by reference, combined with layer profile information obtained with atomic force microscopic techniques. The reflection band shifted left to reflect wavelengths of 400 nm to 500 nm when measured at 60° incident light angle with a Lambda 900 spectrophotometer. An array of blue LEDs 81 was fabricated with eighty 450 nm LEDs (obtained under the trade designation "ZES" as Model LXZ2-PRO2 from Lumileds, Schiphol, Netherlands) having a 5.0 mm staggered spacing to be placed on top of the blue light collimator. Heat fins 83 were attached to the LED array to remove heat generated by the LEDs. Measurements were made with no blue light collimator and then repeated with the blue light collimator in place using a dosimeter (obtained under the trade designation "S121C sensor" with "PM100D METER" from Thor Labs, Dachau/Munich, Germany) positioned 5.1 cm (2 inches) away from the blue LED array. Blue light dose was measured to be 76% higher with the blue light collimator in place.

Example 3

UV-C mirror was made by vapor coating an inorganic optical stack having first optical layers comprising $HfO_2$ and second optical layers comprising $SiO_2$ onto 100 micrometers (4 mil) thick fluoropolymer film (obtained under the trade designation "NOWOFLON TI-W815" from Nowofol, Siegsdorf, Germany). More specifically, a thin film stack comprised of alternating layers of $HfO_2$ and $SiO_2$ and designed to have peak reflectance at 254 nm began by coating layer 1 $HfO_2$ at 30.00 nm was coated. In electron beam deposition, a four-hearth evaporation source was used. Each hearth was cone-shaped and 17 cm³ volume of $HfO_2$ chunks filled it. The magnetically deflected high voltage electron beam was raster scanned over the material surface as filament current of the beam is steadily, in a pre-programmed fashion, increased. Upon completion of the pre-programmed step, the $HFO_2$ surface was heated to evaporation temperature, about 2500° C., and a source shutter opened, the $HfO_2$ vapor flux emerging from the source in a cosine-shaped distribution and condensing upon the substrate material above the source. For enhancement of coating uniformity, the substrate holders rotated during deposition. Upon reaching the prescribed coating thickness (30.00 nm) the filament current shut off; the shutter closed and the $HfO_2$ material cooled. For layer 2 the evaporation source was then rotated to a hearth containing chunks of $SiO_2$ and a similar pre-programmed heating process begins. Here, the $SiO_2$ surface temperature was about 950° C. when the source shutter opened and, upon reaching the prescribed coating thickness (45.02 nm), the filament current shut off; the shutter closed and the $HfO_2$ material cooled. This step-wise process was continued, layer by layer, until a total number of 13 layers was reached. Resulting peak reflectance was measured with a spectrophotometer (obtained under the trade designation "SHIMADZU 2550 UV-VIS" from Shimadzu, Kyoto, Japan) and found to be 99% at 254 nm.

Prophetic Example I

Figure 9:
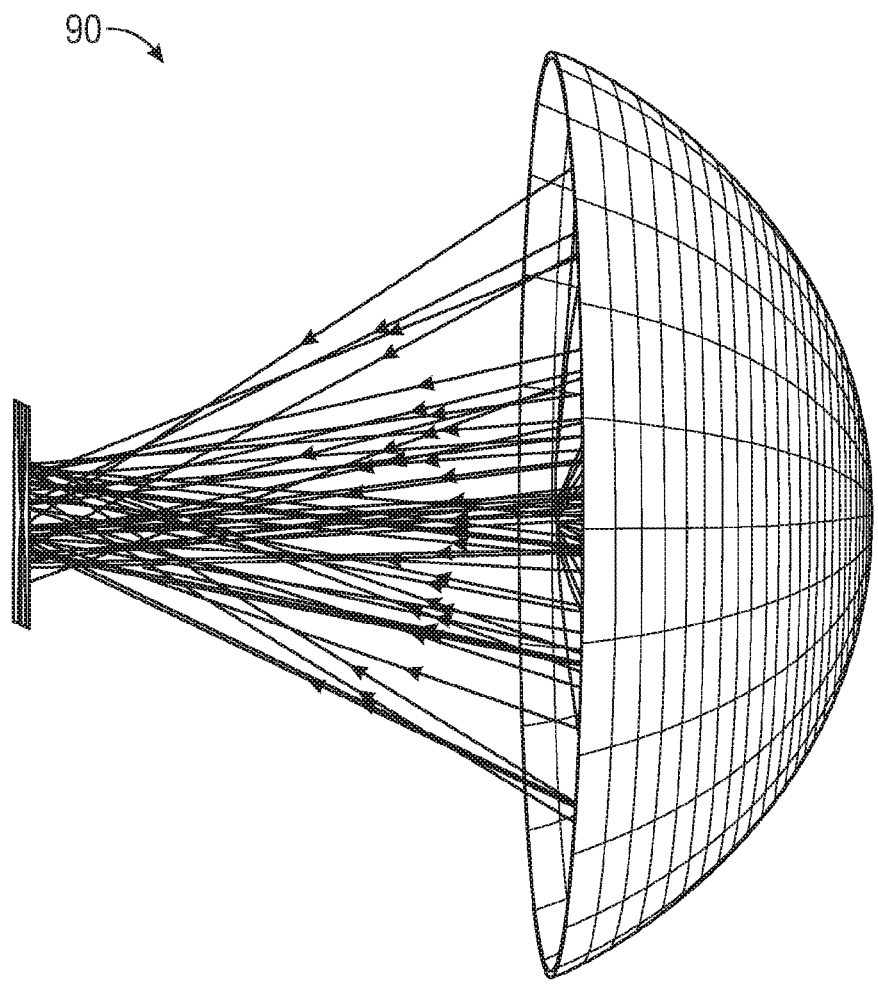
FIG. 9 is a schematic cross-sectional view of an exemplary light concentrator design comprising a transparent UV mirror or transparent blue mirror.

PETG sheet ("SPECTAR 14471") into the parabolic optical element shown in FIG. 9. A UV-C light reflective optical element can be laminated to the parabolic optical element with optically clear adhesive (available under the trade designation "OCA8171" from 3M Company, St. Paul, MN). The UV-C light reflective optical element includes a multilayer optical film comprising first optical layers made with PVDF (polyvinylidene fluoride) (available under the trade designation "PVDF 6008" from 3M DYNEON, St. Paul, MN) and second optical layers comprising a fluoropolymer (available under the trade designation "THV815GZ" from 3M DYNEON, St. Paul, MN). The PVDF ("PVDF 6008") and a fluoropolymer ("THV815GZ") can be coextruded through a multilayer melt manifold to form an optical stack of 600 layers. The layer thickness profile (layer thickness values) of this UV-C light reflective optical element can be adjusted to be about a linear profile with the thinnest layers adjusted to have about a ¼ wave optical thickness (refractive index times physical thickness) for 240 nm light and progressing to the thickest layers which were adjusted to be about a ¼ wave optical thickness for 320 nm light when reflection is measured at a 0° incident light angle (normal angle). The reflection band shifts left to reflect wavelengths of 190 nm to 260 nm when measured at 60° incident light angle.

Prophetic Example II

PETG sheet (available under the trade designation "SPECTAR 14471" from Eastman, Kingsport, TN) can be thermoformed into a parabolic optical element 90 shown in FIG. 9. Light concentrators can be designed utilizing a surface of revolution generated from a section of an ellipse with the source at one focus and the target at the other focus of the ellipse. The source at one focus shines toward the closest vertex of the ellipse. The section of the ellipse used to generate the surface of revolution is the section defined by the latus rectum at the source and the closest vertex to the source. The latus rectum must be larger than the source so that the concentrator can collect most of the light from the source. If the source and target were points, all the light from the source would be collected at the target. Since the source is an array of LEDs and target is an area, Ray Tracing software (available, for example, under the trade designation "ASAP" from Breault Research, Tucson, AZ) can be used to trace a distribution of rays emitted from an array of Lambertian LEDs centered at the focus of the ellipse. The major axis and eccentricity of the ellipse are optimized such that the maximum amount of energy emitted by the LEDs is incident on the target surface.

A UV-C light reflective optical element can be laminated to the parabolic optical element with optically clear adhesive ("OCA8171"). The UV-C light reflective optical element includes a multilayer optical film comprising first optical layers made with polyethylene methyl acrylate (available under the trade designation "ELVALOY 1125" from DOW Chemical Company, Midland, MI) and second optical layers comprising a fluoropolymer ("THV815GZ"). The polyethylene methyl acrylate ("ELVALOY 1125") and fluoropolymer ("THV815") can be coextruded through a multilayer melt manifold feedblock to form an optical stack of 600 layers. The layer thickness profile (layer thickness values) of this UV-C light reflective optical element can be adjusted to be about a linear profile with the thinnest layers adjusted to have about a ¼ wave optical thickness (refractive index times physical thickness) for 200 nm light and progressing to the thickest layers which were adjusted to be about a ¼ wave optical thickness for 320 nm light when reflection is measured at a 0° incident light angle (normal angle). Layer thickness profile would be adjusted to provide for improved spectral characteristics using the axial rod apparatus described in U.S. Pat. No. 6,783,349 (Neavin et al.), the disclosure of which is incorporated here by reference, combined with layer profile information obtained with atomic force microscopic techniques. The reflection band shifts left to reflect wavelengths of 160 nm to 260 nm when measured at 60° incident light angle measured with a Lambda 900 spectrophotometer.

Prophetic Example III

UV-C mirror can be created by sputter coating an inorganic optical stack having first optical layers comprising ZrON and second optical layers comprising $SiO_2$ onto 100 micrometers (4 mil) thick fluoropolymer film (available under the trade designation "NOWOFLON THV815" from Nowofol, Siegsdorf, Germany. UV transparent films can be coated in continuous roll to roll (R2R) fashion, using ZrON as the high refractive index material and $SiO_2$ as the low refractive index material. The optical design is alternating quarter wave thickness layers of the two materials tuned to start reflecting at 200 nm with a gradient of layer thickness to end reflecting at 300 nm. For ZrON, with refractive index at 222 nm at 2.25, the physical thickness target is 24.66 nm. For $SiO_2$, here sputtered from an aluminum-doped silicon sputter target, with refractive index 1.49, the target thickness is 37.23 nm. Layer one ZrON can be DC sputtered from a pure zirconium sputter target in a gas mixture of argon, oxygen and nitrogen. Whereas argon is the primary sputtering gas, oxygen and nitrogen levels are set to achieve transparency, low absorptance and high refractive index. The film roll transport initially starts at a pre-determined speed, and the sputter source power is ramped to full operating power, followed by introduction of the reactive gases and then achieving steady state condition. The sputter source is orthogonal to and wider than the film which is being coated. Upon reaching the desired length of coated film the reactive gases are set to zero and the target was sputtered to a pure Zr surface state. The film direction is next reversed and silicon (aluminum doped) rotary pair of sputter targets has AC frequency (40 kHz) power applied in an argon sputtering atmosphere. Upon reaching steady state, oxygen reactive gas is introduced to provide transparency and low refractive index. At the pre-determined process setting and line speed the second layer is coated over the length which was coated for layer one. The sputter sources are orthogonal to and wider than the film being coated. After reaching the desired length of coated film the reactive oxygen is removed and the target is sputtered in argon to a pure silicon (aluminum doped) surface state. This step-wise process is continued, layer by layer, until a total number of 13 layers is reached. Resulting peak reflectance is expected to be 99% at 222 nm when measured with a spectrophotometer ("SHIMADZU 2550 UV-VIS").

Prophetic Example IV

PETG sheet (available under the trade designation "SPECTAR 14471" from Eastman, Kingsport, TN) can be thermoformed into a parabolic optical element 90 shown in FIG. 9, an exemplary light concentrator design. Light concentrators can be designed utilizing a surface of revolution generated from a section of an ellipse with the source at one focus and the target at the other focus of the ellipse. The source at one focus shines toward the closest vertex of the ellipse. The section of the ellipse used to generate the surface of revolution is the section defined by the latus rectum at the source and the closest vertex to the source. The latus rectum must be larger than the source so that the concentrator can collect most of the light from the source. If the source and target were points, all the light from the source would be collected at the target. Since the source is an array of LEDs and target is an area, Ray Tracing software (available, for example, under the trade designation "ASAP" from Breault Research, Tucson, AZ) can be used to trace a distribution of rays emitted from an array of Lambertian LEDs centered at the focus of the ellipse. The major axis and eccentricity of the ellipse are optimized such that the maximum amount of energy emitted by the LEDs is incident on the target surface. A blue light mirror film as described in Example 5 or a UV-C mirror film as described in Example 6 can then be laminated to the thermoformed elliptical concentrator shape to form a blue light or UV-C light concentrator.

Prophetic Example V

Figure 10:
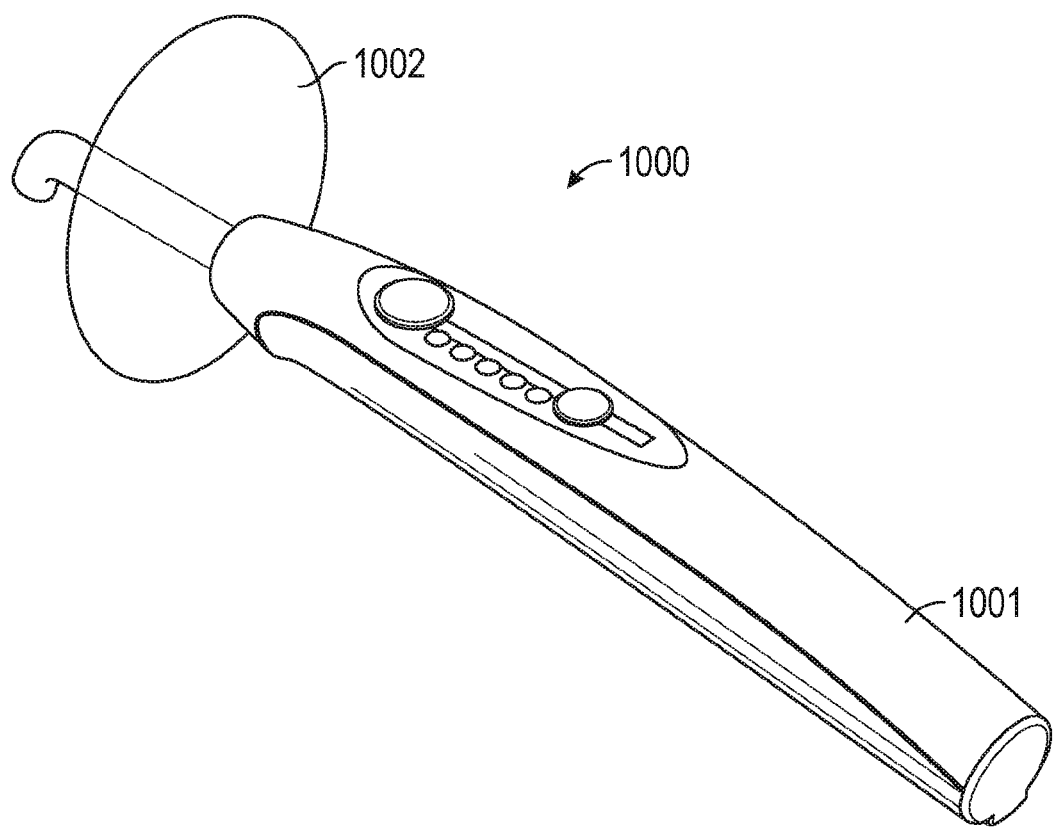
FIG. 10 is a schematic view of exemplary transparent light shield comprising a UV mirror or a blue mirror on a dental filling curing device.

Exemplary dental curing device 1000 shown in FIG. 10 can be made with blue light dental filling curing device 1001 assembled with visible light transparent blue shield 1002 made as described in Example 5.

Prophetic Example VI

Figure 11:
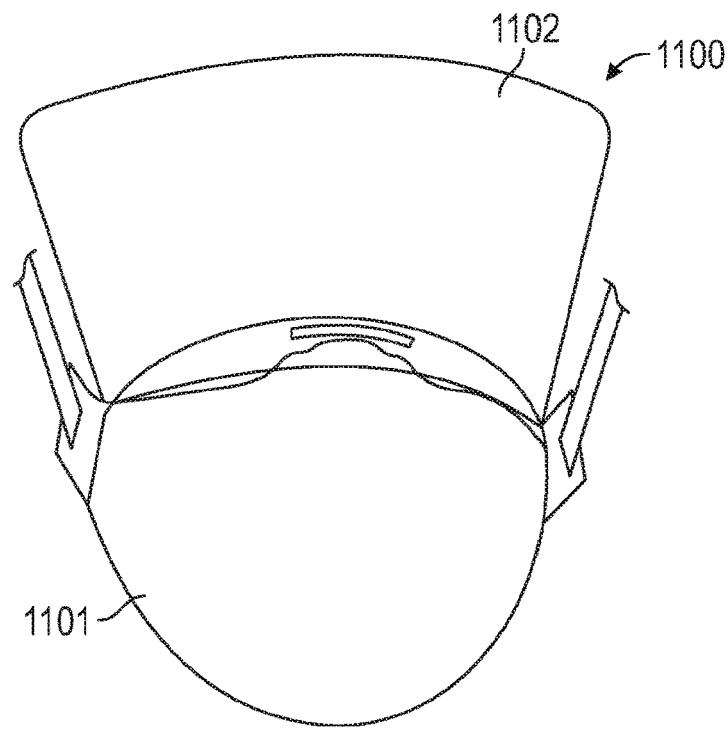
FIG. 11 is a schematic view of an exemplary transparent light shield comprising a UV mirror or a blue mirror on a face mask.

Dusk mask 1100 shown in FIG. 11 can be made with visible light transparent blue light shield 1102, made as described in Example 5, attached to dusk mask 1101.

Prophetic Example VII

Figure 12:
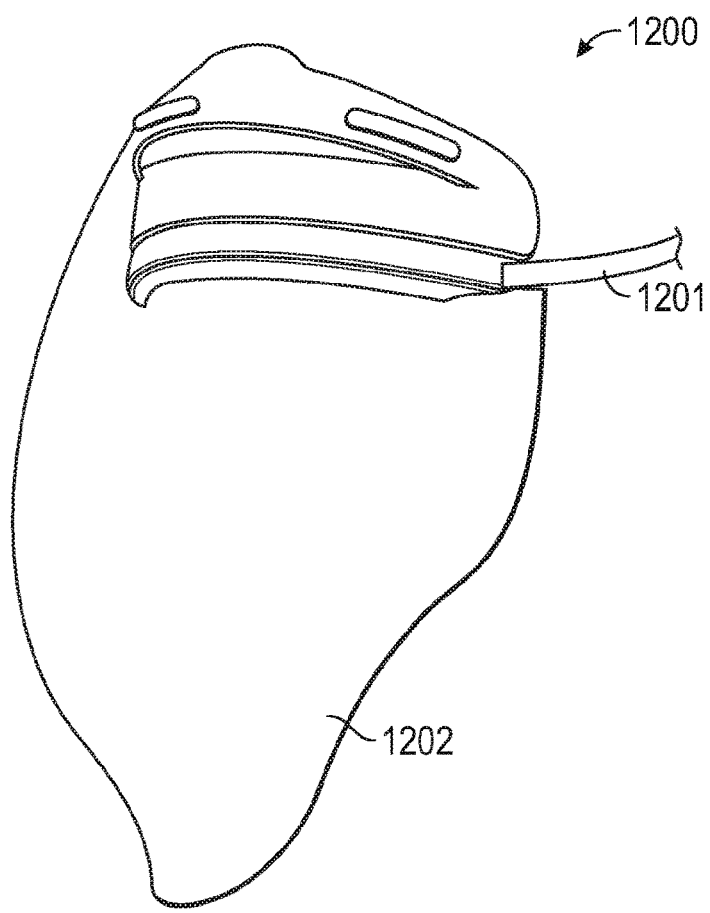
FIG. 12. is a schematic view of an exemplary transparent light shield comprising a UV mirror or a blue mirror on a face shield.

Face shield 1200 shown in FIG. 12 can be made with visible light transparent blue light shield 1202, made as described in Example 5, attached to face shield support head band 1201.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A multilayer optical film comprising at least a plurality of alternating first and second optical layers collectively reflecting at least one of 0°, 30°, 45°, 60°, or 75° incident light angle at least 30 percent of incident ultraviolet light over at least a 30-nanometer wavelength reflection bandwidth in a wavelength range from at least 100 nanometers to 280 nanometers, wherein the at least first optical layer comprises at least one polyethylene copolymer, and wherein the second optical layer comprises at least one of a copolymer comprising tetrafluoroethylene, hexafluoropropylene, and vinylidene fluoride, a copolymer comprising tetrafluoro-ethylene and hexafluoropropylene, or perfluoroalkoxy alkane.

2. The multilayer optical film of claim 1, wherein incident visible light transmission through at least the plurality of alternating first and second optical layers is greater than 30 percent over at least a 30-nanometer wavelength reflection bandwidth in a wavelength range from at least 400 nanometers to 750 nanometers.

3. The multilayer optical film of claim 1, wherein the at least first optical layer comprises at least one of titania, zirconia, zirconium oxynitride, hafnia, or alumina, and wherein the second optical layer comprises at least one of silica, aluminum fluoride, or magnesium fluoride.

4. An UV-C shield comprising the multilayer optical film of claim 1.

5. An UV-C light collimator comprising the multilayer optical film of claim 1.

6. An UV-C light concentrator comprising the multilayer optical film of claim 1.

7. A UV-C disinfection device comprising the multilayer optical film of claim 1.

* * * * *